United States Patent
Rickman et al.

(10) Patent No.: US 9,900,672 B2
(45) Date of Patent: Feb. 20, 2018

(54) OPTOELECTRONIC SWITCH ARCHITECTURES

(71) Applicant: ROCKLEY PHOTONICS LIMITED, London (GB)

(72) Inventors: Andrew Rickman, Marlborough (GB); Nathan Farrington, Arcadia, CA (US)

(73) Assignee: Rockley Photonics Limited, London (GB)

(*) Notice: Subject to any disclaimer, the term of this patent is extended or adjusted under 35 U.S.C. 154(b) by 0 days.

(21) Appl. No.: 15/521,600

(22) PCT Filed: Apr. 22, 2016

(86) PCT No.: PCT/GB2016/051127
§ 371 (c)(1),
(2) Date: Apr. 24, 2017

(87) PCT Pub. No.: WO2016/170357
PCT Pub. Date: Oct. 27, 2016

(65) Prior Publication Data
US 2017/0245028 A1    Aug. 24, 2017

Related U.S. Application Data

(63) Continuation-in-part of application No. 15/072,314, filed on Mar. 16, 2016, now Pat. No. 9,706,276.
(Continued)

(51) Int. Cl.
*H04Q 11/00*    (2006.01)
*H04J 14/02*    (2006.01)
(Continued)

(52) U.S. Cl.
CPC ....... *H04Q 11/0005* (2013.01); *H04L 49/357* (2013.01); *H04Q 11/0066* (2013.01);
(Continued)

(58) Field of Classification Search
USPC .............................................. 398/48, 15, 43
See application file for complete search history.

(56) References Cited

U.S. PATENT DOCUMENTS 6,285,809 B1    9/2001    Nir et al.
6,510,260 B2    1/2003    Chen et al.
(Continued)

FOREIGN PATENT DOCUMENTS

CA    2 386 352 A1    11/2003
EP    0 949 837 A2    10/1999
(Continued)

OTHER PUBLICATIONS

Dong, Ziqian et al.; "Hybrid optoelectronic packet switch with multiple wavelength conversion through an electronic packet switch"; 2013 IEEE 14th International Conference on High Performance Switching and Routing (HPSR); IEEE; Jul. 8, 2013, pp. 97-102.
(Continued)

*Primary Examiner* — Oommen Jacob
(74) *Attorney, Agent, or Firm* — Lewis Roca Rothgerber Christie LLP

(57) ABSTRACT

The present invention provides an optoelectronic switch for transferring an optical signal from an input device to an output device, the optoelectronic switch including an array of interconnected switch modules, which are interconnected by an interconnecting fabric. The switch modules are arranged in an N-dimensional array, the ith dimension having a size Ri (i=1, 2, . . . , N), each switch module having an associated set of coordinates giving its location with respect to each of the N dimensions. Each switch module is a member of N such sub-arrays Si, each sub-array Si comprising Ri switch modules whose coordinates differ only in respect of their location in the ith dimension, and each of
(Continued)

the N sub-arrays being associated with a different dimension.

30 Claims, 16 Drawing Sheets

Related U.S. Application Data

(60) Provisional application No. 62/251,572, filed on Nov. 5, 2015, provisional application No. 62/152,696, filed on Apr. 24, 2015, provisional application No. 62/234,454, filed on Sep. 29, 2015.

(51) Int. Cl.
    *H04J 14/06*     (2006.01)
    *H04L 12/931*     (2013.01)

(52) U.S. Cl.
    CPC ........... *H04Q 2011/0016* (2013.01); *H04Q 2011/0039* (2013.01); *H04Q 2011/0041* (2013.01); *H04Q 2011/0052* (2013.01)

(56) References Cited

U.S. PATENT DOCUMENTS

| | | | |
|---|---|---|---|
| 6,512,612 B1* | 1/2003 | Fatehi | H04Q 11/0005 370/401 |
| 6,529,301 B1* | 3/2003 | Wang | H04Q 11/0005 398/82 |
| 7,088,919 B2 | 8/2006 | Graves | |
| 7,177,544 B1 | 2/2007 | Wada et al. | |
| 7,218,853 B2 | 5/2007 | Handelman | |
| 7,257,283 B1 | 8/2007 | Liu et al. | |
| 7,260,329 B1 | 8/2007 | Fall et al. | |
| 7,389,046 B1 | 6/2008 | Tanaka et al. | |
| 7,426,210 B1 | 9/2008 | Miles et al. | |
| 7,430,346 B2 | 9/2008 | Jennen | |
| 7,526,603 B1 | 4/2009 | Abdollahi-Alibeik et al. | |
| 7,577,355 B2* | 8/2009 | Sato | H04J 14/022 398/12 |
| 7,590,359 B2* | 9/2009 | Kim | H04J 14/0227 398/186 |
| 7,724,759 B2 | 5/2010 | Bozso et al. | |
| 7,764,882 B2 | 7/2010 | Beacken | |
| 7,773,606 B2 | 8/2010 | Dobjelevski et al. | |
| 7,773,608 B2 | 8/2010 | Miles et al. | |
| 7,872,990 B2 | 1/2011 | Guo et al. | |
| 7,899,327 B2 | 3/2011 | Wada et al. | |
| 8,065,433 B2 | 11/2011 | Guo et al. | |
| 8,073,327 B2* | 12/2011 | Mayer | H04J 14/0227 398/43 |
| 8,098,593 B2 | 1/2012 | Guo et al. | |
| 8,270,830 B2 | 9/2012 | Kirkpatrick et al. | |
| 8,472,805 B2 | 6/2013 | Lam et al. | |
| 8,473,659 B2 | 6/2013 | Koka et al. | |
| 8,493,976 B2 | 7/2013 | Lin | |
| 8,774,625 B2 | 7/2014 | Binkert et al. | |
| 8,792,787 B1 | 7/2014 | Zhao et al. | |
| 8,867,915 B1 | 10/2014 | Vahdat et al. | |
| 8,891,914 B2 | 11/2014 | Ticknor et al. | |
| 8,902,751 B1 | 12/2014 | Zhou et al. | |
| 8,942,559 B2 | 1/2015 | Binkert et al. | |
| 9,008,510 B1 | 4/2015 | Zhao et al. | |
| 9,124,383 B1* | 9/2015 | Frankel | H04J 14/06 |
| 9,167,321 B2 | 10/2015 | Chen | |
| 9,184,845 B1 | 11/2015 | Vahdat et al. | |
| 2002/0057861 A1 | 5/2002 | Ge et al. | |
| 2002/0114036 A1* | 8/2002 | Ghani | H04J 14/02 398/49 |
| 2002/0186432 A1* | 12/2002 | Roorda | H04J 14/0204 398/82 |
| 2003/0138189 A1 | 7/2003 | Rockwell et al. | |
| 2004/0037558 A1* | 2/2004 | Beshai | H04Q 11/0005 398/57 |
| 2005/0105906 A1 | 5/2005 | Barbosa et al. | |
| 2007/0009262 A1* | 1/2007 | Perkins | H04J 14/0201 398/58 |
| 2009/0070549 A1* | 3/2009 | Solomon | G06F 15/803 712/10 |
| 2009/0226183 A1* | 9/2009 | Kang | G06E 3/001 398/158 |
| 2010/0254703 A1 | 10/2010 | Kirkpatrick et al. | |
| 2012/0033968 A1* | 2/2012 | Testa | H04J 14/0204 398/47 |
| 2012/0148242 A1 | 6/2012 | Chen et al. | |
| 2012/0201540 A1* | 8/2012 | Uekama | H04L 47/2441 398/54 |
| 2012/0243869 A1* | 9/2012 | Sato | H04J 14/0212 398/49 |
| 2012/0250574 A1 | 10/2012 | Marr | |
| 2015/0249501 A1 | 9/2015 | Nagarajan | |
| 2015/0309265 A1 | 10/2015 | Mehrvar et al. | |
| 2017/0041691 A1* | 2/2017 | Rickman | H04Q 11/0071 |

FOREIGN PATENT DOCUMENTS

| | | |
|---|---|---|
| GB | 2530833 A | 4/2016 |
| WO | WO 2007/124514 A2 | 11/2007 |
| WO | WO 2013/063543 A1 | 5/2013 |
| WO | WO 2013/165390 A1 | 11/2013 |
| WO | WO 2014/180292 A2 | 11/2014 |
| WO | WO 2015/060820 A1 | 4/2015 |

OTHER PUBLICATIONS

Guo, Chuanxiong et al., "BCube: A High Performance, Server-centric Network Architecture for Modular Data Centers", ACM, SIGCOMM'09, Aug. 17-21, 2009, pp. 63-74.
Kachris, Christoforos et al.; "A Survey on Optical Interconnects for Data Centers"; IEEE Communications Surveys and Tutorials, vol. 14; No. 4; Oct. 1, 2012, pp. 1021-1036.
Kodi, Avinash et al.; "Reconfigurable and adaptive photonic networks for high-performance computing systems"; Applied Optics; vol. 48; No. 22; Aug. 1, 2009; pp. E13-E23.
"2000 Networkers", Campus Switch Architecture Session 2806, Cisco Systems, Inc., 2000, 65 pages.
"66AK2E0x Multicore DSP+ARM KeyStone II System-on-Chip (SoC)", System Interconnect, Texas Instruments Incorporated, 2012-2015, pp. 1-282.
Ahn, Jung Ho et al., "HyperX: Topology, Routing, and Packaging of Efficient Large-Scale Networks", ACM, SC'09, Nov. 14-20, 2009, 11 pages, Portland, Oregon, USA.
Andreyev, Alexey, "Introducing data center fabric, the next-generation Facebook data center network", Facebook, Nov. 14, 2014, 13 pages.
Arimilli, Baba et al., "The PERCS High-Performance Interconnect", 18th IEEE Symposium on High Performance Interconnects, 2010, pp. 75-82.
Bhuyan, Laxmi N. et al., "Generalized Hypercube and Hyperbus Structures for a Computer Network", IEEE Transactions on Computers, Apr. 1984, pp. 323-333, vol. C-33, No. 4.
Dumais, Patrick et al., "Scaling up Silicon Photonic Switch Fabrics", IEEE, 2015, pp. 175-176.
Farrington, Nathan et al., "Data Center Switch Architecture in the Age of Merchant Silicon", High Performance Interconnects, Aug. 25, 2009, pp. 93-102.
Farrington, Nathan et al., "Facebook's Data Center Network Architecture", 2013 Optical Interconnects Conference, May 1, 2013, pp. 49-50.
"Hot Interconnects 22", IEEE Symposium on High Performance Interconnects, Aug. 26-28, 2014, 1 page, Google Headquarters, Mountain View, California.
Invitation to Pay Additional Fees and Partial Search Report mailed Feb. 23, 2017 in related International Application No. PCT/EP2016/076755, 8 pages.
International Search Report and Written Opinion of the International Searching Authority, dated Feb. 7, 2017, Corresponding to PCT/EP2016/076756, 15 pages.

(56) References Cited

OTHER PUBLICATIONS

International Search Report and Written Opinion of the International Searching Authority, dated May 2, 2017, Corresponding to PCT/EP2016/076755, 33 pages.
International Search Report and Written Opinion of the International Searching Authority, dated Jun. 6, 2016, Corresponding to PCT/GB2016/051127, 17 pages.
International Search Report and Written Opinion of the International Searching Authority, dated Jun. 30, 2017, Corresponding to PCT/EP2017/056129, 19 pages.
Iyer, Sundar et al., "Techniques for Fast Shared Memory Switches", Stanford HPNG Technical Report TR01-HPNG-081501, 2001, 12 pages.
Mandyam, Lakshmi et al., "Switch Fabric Implementation Using Shared Memory", Freescale Semiconductor, Inc., 2004, pp. 1-8.
Miao, Wang et al., "Novel flat datacenter network architecture based on scalable and flow-controlled optical switch system", Optics Express, Feb. 10, 2014, 8 pages, vol. 22, No. 3.
Miao, Wang et al., "Petabit/s Data Center Network Architecture with Sub-microseconds Latency Based on Fast Optical Switches", Ecoc—ID: 0630, 2015, 3 pages.
Padmanabhan, Krishnan et al., "Dilated Networks for Photonic Switching", IEEE Transactions on Communications, Dec. 1987, vol. COM-35, No. 12., pp. 1357-1365.
Parsons, N.J. et al., "Multidimensional Photonic Switches", Photonic Switching II, Proceedings of the International Topical Meeting, Apr. 12-14, 1990, pp. 364-369, Kobe, Japan.
Shekel, Eyal et al., "Optical packet switching", Proc. Of SPIE, 2005, pp. 49-62, vol. 5625.
Suzuki, Keijiro et al., "Ultra-compact 8 x 8 strictly-non-blocking Si-wire PILOSS switch", Optics Express, Feb. 24, 2014, 8 pages, vol. 22, No. 4.
Tabatabaee, Vahid, "Switch Fabric Architectures", University of Maryland, ENTS689L: Packet Processing and Switching, Fall 2006, pp. 1-18.
U.K. Intellectual Property Office Search Report, Dated Jan. 30, 2017, Received Feb. 1, 2017, for Patent Application No. GB1611433.2, 3 pages.
U.K. Intellectual Property Office Search Report, Dated Nov. 29, 2016, Received Dec. 1, 2016, for Patent Application No. GB1611197.3, 3 pages.
Wu, Haitao et al., "MDCube: A High Performance Network Structure for Modular Data Center Interconnection", ACM, CoNEXT'09, Dec. 1-4, 2009, Rome, Italy.
Zahavi, Eitan, "Fat-tree routing and node ordering providing contention free traffic for MPI global collectives", Journal of Parallel and Distributed Computing, 2012, pp. 1-10.
Zahavi, Eitan et al., "Quasi Fat Trees for HPC Clouds and their Fault-Resilient Closed-Form Routing", HOTI 2014, pp. 1-21.

* cited by examiner

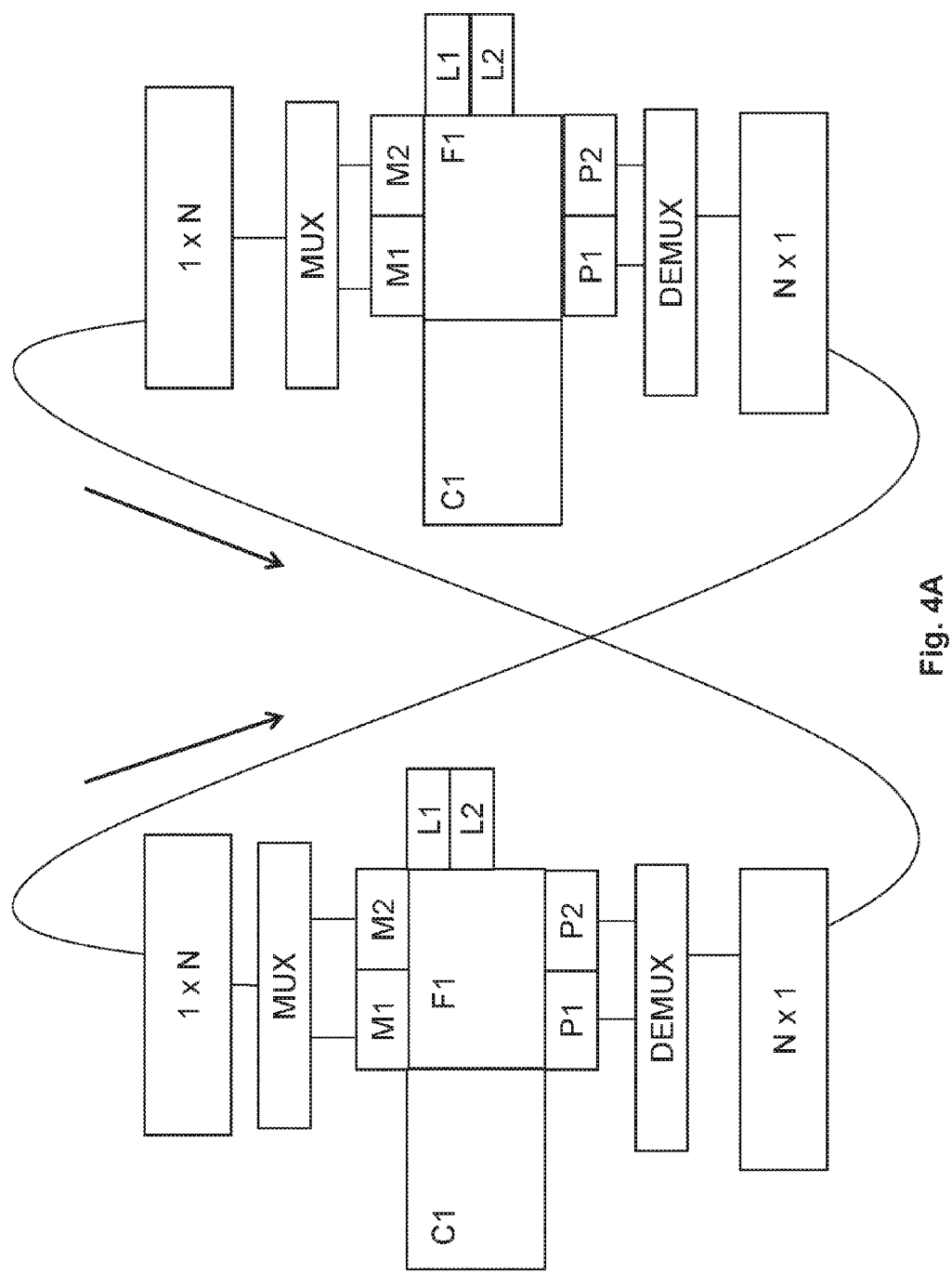

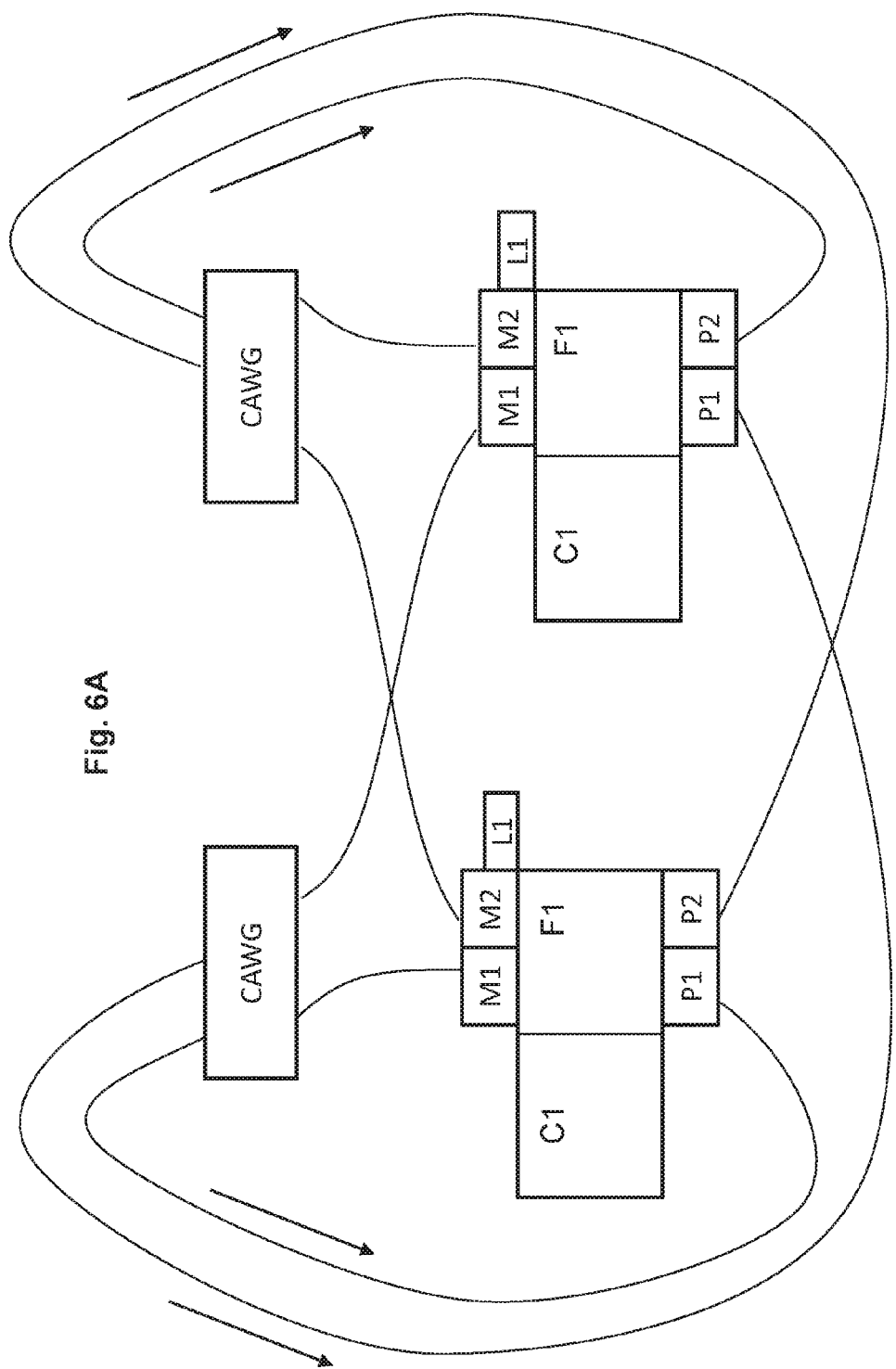

OPTOELECTRONIC SWITCH ARCHITECTURES

CROSS-REFERENCE TO RELATED APPLICATION(S)

This application is a National Phase Patent Application of PCT/GB2016/051127, filed on Apr. 22, 2016, which is a continuation in part of U.S. patent application Ser. No. 15/072,314, filed on Mar. 16, 2016, issued as U.S. Pat. No. 9,706,276 on Jul. 11, 2017, which claims the benefit of U.S. Provisional Patent Application No. 62/251,572, filed on Nov. 5, 2015. International Patent Application number PCT/GB2016/051127, filed on Apr. 22, 2016, also claims the benefit of U.S. Provisional Patent Application No. 62/152,696, filed on Apr. 24, 2015; U.S. Provisional Patent Application No. 62/234,454, filed on Sep. 29, 2015; and U.S. Provisional Patent Application No. 62/251,572, filed on Nov. 5, 2015. The entire contents of all of which are incorporated herein by reference.

FIELD OF THE INVENTION

The present invention relates to optoelectronic switches, and in particular to topologies and arrangements of switch modules within the optoelectronic switches.

BACKGROUND OF THE INVENTION

The present and continuing increase in data traffic volumes and the requirement for speed of switching and reduced energy consumption in datacenters has driven a great deal of recent innovation. In particular, it has been realized that optical switching offers many of the desired properties but optical devices need to be controlled by and interfaced with electronic devices including traditional electronic data servers.

Optical devices themselves do not necessarily reduce the size or complexity of a switch. In order to improve flexibility in the assembly and application of optical switching units it is desirable to improve the scalability of an optical switch. One way of doing this relates to the topology of the components within the switch network. It is desirable to produce a highly scalable optical switching unit. Thus, there remains a requirement for a packet switch optimally benefiting from the speed of optics and the flexibility of CMOS electronics assembled in an architecture appropriate for huge scalability.

In order to most clearly describe a network topology, for example a computer network, or an optical switching network, as in embodiments of the present invention, the following terminology and notation may be employed:

A graph G is a set of vertices V and a set of edges E, the edges connecting pairs of vertices. The graph may be expressed as G=(V, E). Accordingly, a network may be modelled as a graph, wherein nodes (i.e. individual switching elements) are represented by vertices, and the links between pairs of nodes are the graph edges.

The physical topology of the network is the location in real, 3D space of the nodes and the links.

The logical topology of the network is represented mathematically as the graph of the network G=(V, E).

The radix R of a single switching element is the number of ports on that switching element. The switch ports may be either client ports (connected to external clients such as hosts or servers) or fabric ports (connected to other switching elements), or unconnected.

The number of client ports per switching element=C, and the number of fabric ports per switching element=F.

A path is a sequence of links connecting a source node to a destination node, and the length of a path is the number of links in the sequence. The minimal path between two nodes, is the path with the shortest length, i.e. with the fewest links (also referred to herein as "hops"), and the diameter of the network is the longest minimal path between any two nodes. It is noted that the time taken e.g. for a packet of data to traverse a path in a network may be dependent on other features in addition to the length of the path, such as processing steps which may occur between hops.

Switching elements in a switch may be arranged into N dimensions (also referred to herein as tiers).

A known, named network topology is the Folded Clos network. At present, this is a popular topology employed in datacenter networks and multi-chip switches. It is also known as the k-ary n-tree. The network may be described in terms only of R and N:

$C_{total}$ = total number of client ports, i.e. the number of clients which may be interconnected = $2\left(\frac{R}{2}\right)^N$.

$P$ = total number of switching elements = $(2N-1)\left(\frac{R}{2}\right)^{N-1}$ Diameter, $D=2(N-1)$ Table 1 below shows the value of N, the number of client ports for various different values of the parameters, which indicates, as discussed above, the number of external clients which may be connected using this network with the given parameters.

TABLE 1

Values of N for a Folded Clos network having varying values of R and N.

| $C_{total}$ | N = 2 | N = 3 | N = 4 | N = 5 |
|---|---|---|---|---|
| R = 4 | 8 | 16 | 32 | 64 |
| R = 8 | 32 | 128 | 512 | 2,048 |
| R = 12 | 72 | 432 | 2,592 | 15,552 |
| R = 16 | 128 | 1,024 | 8,192 | 65,536 |
| R = 24 | 288 | 3,456 | 41,472 | 497,664 |
| R = 32 | 512 | 8,192 | 131,072 | 2,097,152 |
| R = 64 | 2,048 | 65,535 | 2,097,152 | 67,108,864 |
| R = 128 | 8,192 | 524,288 | 33,554,432 | 2,147,483,648 |

SUMMARY OF THE INVENTION

At its most general, the present invention provides a highly-scalable optoelectronic switch including a plurality of switch modules, arranged in a manner which allows for the switch to be extended into multiple dimensions. This presents significant advantages with regard to cost-effective scalability of optoelectronic switches.

Accordingly, the present invention aims to solve the above problems by providing, according to a first aspect, an optoelectronic switch for transferring an optical signal from an input device to an output device, the optoelectronic switch including an array of interconnected switch modules, which are interconnected by an interconnecting fabric, wherein:

the switch modules are arranged in an N-dimensional array, the $i^{th}$ dimension having a size $R_i$ (i=1, 2, ..., N), each switch module having an associated set of coordinates giving its location with respect to each of the N dimensions;

each switch module is a member of N sub-arrays $S_i$, each sub-array $S_i$ comprising $R_i$ switch modules whose coordinates differ only in respect of their location in the $i^{th}$ dimension, and each of the N sub-arrays being associated with a different dimension, and each switch module has:
  a client portion for connecting to an input device and/or an output device;
  a first fabric portion and a second fabric portion, configured to process signals and communicate with other switch modules, each of the first fabric portion and the second fabric portion having a transmission side and a receiving side,
  wherein the transmission side of the first fabric portion includes:
    a transmission side input for receiving a first electronic signal carrying destination information about a destination switch module for the first electronic signal, the first electronic signal received from either:
      a receiving side output of the second fabric portion or
      an input device, via the client portion;
    a modulator for converting said first electronic signal into a first plurality of optical signals containing the same information, the wavelength of each of the first plurality of optical signals selected based on the destination information;
    a transmission side passive router having inputs and outputs, the path of an optical signal from a given input dependent on the wavelength of that optical signal,
  wherein the receiving side of the first fabric portion includes:
    a receiving side passive router having inputs and outputs, wherein
      the path of an optical signal through the receiving side passive router depends on the wavelength of that optical signal,
      an input of each receiving side passive router is optically connected to an output of a first passive router on each other switch module in the same sub-array, and is configured to receive an optical signal from that output
    a photodetector for converting a second plurality of optical signals from the receiving side passive router into a corresponding second electronic signal; and
    a receiving side output for sending the second electronic signal to either:
      a transmission side input of the second fabric portion, or
      an output device, via the client portion.

The same advantages are conferred by an optoelectronic switch according to a second aspect of the invention, which provides an optoelectronic switch for transferring an optical signal from an input device to an output device, the opto- electronic switch including an array of interconnected switch modules, which are interconnected by an interconnecting fabric, wherein:

the switch modules are arranged in an N-dimensional array, the ith dimension having a size Ri (i=1, 2, ..., N), each switch module having an associated set of coordinates giving its location with respect to each of the N dimensions;

each switch module is a member of N sub-arrays Si, each sub-array Si comprising Ri switch modules whose coordinates differ only in respect of their location in the ith dimension, and each of the N sub-arrays being associated with a different dimension, and each switch module has:
  a client portion for connecting to an input device or an output device;
  a first fabric portion and a second fabric portion, each for processing signals and communicating with other switch modules, the first fabric portion having a transmission side and a receiving side,
  wherein the transmission side of the first fabric portion includes:
    a transmission side input for receiving a first electronic signal carrying destination information about a destination switch module for the first electronic signal, the first electronic signal received from either:
      a receiving side output of the second fabric portion or
      an input device, via the client portion;
    a modulator for converting said first electronic signal into a first plurality of optical signals containing the same information;
    a transmission side multiplexer for converting the first plurality of optical signals into a multiplexed fabric signal,
    a transmission side active switch having an input for receiving the multiplexed fabric signal, and at least $(R_i-1)$ outputs, each output associated with one of the other switch modules in the same sub-array, the transmission side active switch configured to direct the multiplexed fabric signal from its input to any one of its outputs, based on the destination information;
  wherein the receiving side of the first fabric portion includes:
    a receiving side active switch, having at least (Ri−1) inputs, each associated with one of the other switch modules in the same sub-array, and an output, the at least (Ri−1) inputs each configured to receive a multiplexed fabric signal from an output of a transmission side active switch of one of the other switch modules in the same sub-array, and configured to direct the multiplexed fabric signal from the input at which it is received to the output;
    a receiving side demultiplexer for receiving the multiplexed fabric signal from the receiving side active switch, and configured to convert it into a second plurality of optical signals;
    a photodetector for converting a second plurality of optical signals into a corresponding second electronic signal; and
    a receiving side output for sending the second electronic signal to either:
      a transmission side input of the second fabric portion, or an output device, via the client portion.

In embodiments of the above-described second aspect of the present invention, at least ($R_i$−1) inputs/outputs are required on the receiving side and transmission side active switches respectively. In this way, each transmission side active switch is able to couple to a receiving side active switch on each other switch module in the sub-array. However, it is preferred that the transmission and receiving side active switches have $R_i$ outputs/inputs respectively. Then, the transmission side of the first fabric portion of each switch module may also form a connection to the receiving side of that first fabric portion on the same switch module. This may be useful, for example, in testing scenarios.

The first and second aspects of the present invention provide optoelectronic switches which have as their basis a full-mesh, or generalized hypercube-like topology. However, the advantages provided by these topologies may also be provided by optoelectronic switches employing a "star-like" network topology. Accordingly, a third aspect of the present invention provides An optoelectronic switch for transferring an optical signal from an input device to an output device, the optoelectronic switch including an array of interconnected switch modules, which are interconnected by an interconnecting fabric, wherein:
   the switch modules are arranged in an N-dimensional array, the $i^{th}$ dimension having a size $R_i$ (i=1, 2, ..., N), each switch module having an associated set of coordinates giving its location with respect to each of the N dimensions;
   each switch module is a member of N sub-arrays $S_i$, each sub-array $S_i$ comprising:
      $R_i$ switch modules whose coordinates differ only in respect of their location in the $i^{th}$ dimension, each of the N sub-arrays being associated with a different dimension, and
      a set of passive routers, each having inputs and outputs, the path of an optical signal through the passive router from a given input dependent on the wavelength of that optical signal;
   each switch module has:
      a client portion for connecting to an input device or an output device;
      a first fabric portion and a second fabric portion, each for processing signals and communicating with other switch modules, the first fabric portion having a transmission side and a receiving side,
      wherein the transmission side of the first fabric portion includes:
         a transmission side input for receiving a first electronic signal carrying destination information about a destination switch module for the first electronic signal, the first electronic signal received from either:
            a receiving side output of the second fabric portion or
            an input device, via the client portion;
         a modulator for converting said first electronic signal into a first plurality of optical signals containing the same information;
      wherein each passive router in the set of passive routers associated with a given sub-array is configured to receive one of the first plurality of optical signals from a modulator on each switch module in that sub-array, and to direct that optical signal to one of its outputs, depending on the wavelength of that optical signal, and the input of the passive router at which it arrives, and
      wherein the receiving side of the first fabric portion includes:
         a photodetector configured to receive a second plurality of optical signals from the set of passive routers, and to convert the second plurality of optical signals into a corresponding second electronic signal;
         a receiving side output for sending the second electronic signal to either:
            a transmission side input of the second fabric portion, or
            an output device, via the client portion.

A fourth aspect of the present invention provides another optoelectronic switch operating on the principle of a star-like network topology. More specifically, a fourth aspect of the invention provides an optoelectronic switch for transferring an optical signal from an input device to an output device, the optoelectronic switch including an array of interconnected switch modules, which are interconnected by an interconnecting fabric, wherein:
   the switch modules are arranged in an N-dimensional array, the $i^{th}$ dimension having a size $R_i$ (i=1, 2, ..., N), each switch module having an associated set of coordinates giving its location with respect to each of the N dimensions;
   each switch module is a member of N sub-arrays $S_i$, each sub-array $S_i$ comprising:
      $R_i$ switch modules whose coordinates differ only in respect of their location in the $i^{th}$ dimension, each of the N sub-arrays being associated with a different dimension, and
      a fabric active switch, having $R_i$ inputs and $R_i$ outputs, configured to direct a signal from any one of the $R_i$ inputs to any one of the $R_i$ outputs depending on the destination information contained in the signal;
   each switch module has:
      a client portion for connecting to an input device or an output device;
      a first fabric portion for processing signals and communicating with other switch modules, the first fabric portion having a transmission side and a receiving side,
      wherein the transmission side of the first fabric portion includes:
         a transmission side input for receiving a first electronic signal carrying destination information about a destination switch module for the first electronic signal, the first electronic signal received from either:
            a receiving side output of the first fabric portion or
            an input device, via the client portion;
         a modulator for converting said first electronic signal into a first plurality of optical signals containing the same information;
         a transmission side multiplexer for converting the first plurality of optical signals into a multiplexed fabric signal;
         a transmission side active switch having an input and N outputs, for receiving the multiplexed fabric signal and directing it to one of the N outputs, the selection of said output based on the destination information, and wherein each of the N outputs is connected to one of the $R_i$ inputs of the fabric active switch included in each of the N sub-arrays of which that switch module is a member;
      wherein, each fabric active switch is configured to direct a multiplexed fabric signal which arrives at one of its $R_i$ inputs, from a transmission active switch of a switch module to which it is connected, to one of its $R_i$ outputs, based on destination information contained in the multiplexed fabric signal, and:

wherein the receiving side of the first fabric portion includes:

a receiving side active switch having N inputs and an output, each of the N inputs configured to receive a multiplexed fabric signal from an output of one of the N fabric active switches included in the sub-arrays of which the switch module is a member, and is configured to direct the received multiplexed fabric signal from the input at which it is received to the output;

a receiving side demultiplexer for converting the multiplexed fabric signal into a second plurality of optical signals;

photodetector configured to receive the second plurality of optical signals from the set of passive routers, and to convert the second plurality of optical signals into a corresponding second electronic signal; and a receiving side output for sending the second electronic signal to either:

a transmission side input of the first fabric portion, or an output device, via the client portion.

For the avoidance of confusion, it is noted that in the following, "fabric portion" is used to describe the fabric port itself, i.e. the interface between the switch module and the network fabric (i.e. the links between switch modules), and all of the associated components within the switch module. Similarly, "client portion" is used to describe the client port itself i.e. the interface with the external client and all of the associated components within the switch module. An input device and/or an output device may refer to external clients such as servers or hosts.

Switch modules according to the aspects of the invention set out above provide the functionality required to construct a scalable, multidimensional (i.e. N>1, using the terminology introduced earlier in the application) optoelectronic switch which is able to transfer an optical signal received at a client portion of one switch module to a client portion of another switch module. The conversion from electrical to optical signals associated with the modulators and photodetectors allow the majority of the data transfer to occur in the optical domain, rather than the electronic domain. Thus, it is possible to transmit data at higher rates and over long distances, at a lower power loss than would be the case in the electronic domain. Additionally, the use of the optical domain enables wavelength-division multiplexing to be used. A further important advantage of using the optical domain during active switching (e.g. in the second and fourth aspects of the present invention) is bit-rate independence, wherein switch plane data operates at packet rate, and not bit-rate.

The "size" $R_i$ of the $i^{th}$ dimension is most easily understood by considering e.g. 120 switch modules arranged in a 4 by 5 by 6 array. In which case $R_1=4$, $R_2=5$, and $R_3=6$. In other words, the size of the $i^{th}$ dimension may also be considered to be the length of the array in the direction associated with that dimension. It must be stressed that this does not mean that the modules are physically arranged in an e.g. 3D array—it is merely representative of the connections between the switch modules as is described in more detail below. This is clear from the fact that the switch modules may be arranged in a 5D array, which is not possible in "real" space. Similarly, the "coordinates" do not refer to a location in physical space of the switch modules, within the array. They merely represent the relative position of the switch modules in the array, with respect to the connections therebetween.

The first, second, third and fourth aspects of the present invention may have any one or, to the extent that they are compatible, any combination of the following optional features.

The overall interconnecting mesh formed between the fabric portions of all of the switch modules and including the active switches may be referred to as "the optical fabric" or "the switch fabric" and includes optical links connecting the various components. The optical links are preferably optical fibres, and are preferably bidirectional. Bidirectionality may be achieved by bundling two or more optical links together inside a single cable. Alternatively, the links may be in the form of optical polymer waveguides embedded e.g. in a PCB or a silicon waveguide formed in or on a substrate. Throughout this application, the term "active switch" refers to a type of switch which is able to actively control the path which a signal traverses within it. Thus, the active switch is able to provide full-mesh connectivity, without the requirement for a full-mesh of optical fibres connecting the switch modules, or the like. The active switch preferably operates in a non-blocking fashion, and more preferably operates in a strictly rather than rearrangeably non-blocking fashion. The active switches of the second and fourth aspects of the present invention are connected only to switch modules and not to client devices.

Similarly, the term passive router refers to a component where the path that a signal takes through it is determined only by the properties of the signal itself. More specifically, as in the first and third aspects of the present invention, the output of e.g. the transmission side passive router is selected based purely on the input at which an optical signal arrives, and the wavelength of that optical signal. There is no external control required to select the output, and the path is "chosen" merely due to the construction and properties of the passive router itself. In preferred embodiments of the present invention, the passive router is a passive optical router, and preferably a cyclic arrayed waveguide grating (CAWG).

In preferred embodiments, the optoelectronic switch may be in the form of a 2-dimensional optoelectronic switch including switch modules connected in an X by Y array, having X rows (of Y switch modules) and Y columns (of X switch modules). In these 2-dimensional embodiments, the sub-arrays may be rows or columns of switch modules. In embodiments of the first aspect of the invention in particular, each of the switch modules in a given row (or column) are interconnected in a full-mesh fashion via the passive routers. In embodiments of the second aspect of the invention, the same applies, except the full-mesh interconnectivity is provided by the active switches on each switch module.

In embodiments of the third and fourth aspects of the present invention, there is a shared node structure or hub associated with each of the sub-arrays, i.e. with each row and each column. In the third aspect, the node structure is in the form of a set of passive routers, the set of passive routers connected to each switch module in the row/column. This is in contrast to the first and second aspects in which the switch modules are connected directly to each other, not via a node structure. In the fourth aspect, the node structure is in the form of the set of $K_i$ fabric active switches.

In other preferred embodiments, the optoelectronic switch may be in the form of a 3-dimensional optoelectronic switch having switch modules arranged in an X by Y by Z array having:

X columns (each column being made up of a Y by Z array),
Y rows (each row being made up of an X by Z array), and
Z layers (each layer being made up of an X by Y array).

Then, each sub-array of switch modules, each of which are located in e.g. the same column/row but in different layers, may be interconnected in a full-mesh fashion (first aspect), in a full-mesh fashion via an active switch (second aspect), via a set of passive routers (third aspect), or via two active switches (fourth aspect).

From the above, it is clear that each switch module in the array requires a number of fabric portions which is greater than or equal to the number of dimensions in which it is desirable to switch optical signals. More specifically, each of the fabric portions is associated with a different sub-array of which a given switch module is part. Accordingly, the switch module can transfer data, using the routes described above, to any other switch module with which it shares a sub-array, via the fabric portion of that switch module which is associated with the dimension (i.e. sub-array) required. After an optical hop has taken place, the signal arrives at a different switch module which is a member of a different set of sub-arrays from the first, and can then perform the same process to send the data to another switch module having a sub-array in common with it. In this way, all data transfers from one switch module to another can occur in a series of optical (and/or electronic) hops.

Using the above-described arrangement, it is possible to send data from any switch module in the array, to any other switch module in the array by a maximum of N optical hops (where an optical hop is a hop which involves the signal traversing the optical fabric, via an active switch). In the present invention, this is made possible because the individual switch modules are able to act as intermediate switch modules, i.e. because the output of a first fabric portion can send a signal (e.g. a packet of data) to the input of another fabric portion on the same switch module, and correspondingly an input of a first portion on a switch module can receive data from the output of a second switch module. The electronic signal may be transferred between two fabric portions on the same switch module using an integrated switch, such as an electronic crossbar switch, or an electronic shared-memory switch, providing connections between two fabric portions, two client portions or a connection between one of each. Thus, during a data transfer operation, data can perform an optical hop to another fabric portion which is located on another switch module in the same sub-array. Then, data can perform an electronic hop through the switch module itself to a fabric portion associated with a different sub-array, and then a second optical hop may occur, the process being repeated up to N times, until the packet of data reaches its final destination, i.e. the switch module having the client portion via which the data (e.g. in packet form) is transferred to the output device. Accordingly, there are preferably at least N fabric portions on each switch module.

Embodiments of the fourth aspect of the present invention may operate slightly differently from embodiments of the first to third aspects. In particular, the transmission side of each fabric portion of embodiments of the fourth aspect of the invention includes a transmission side active switch with one input and N outputs. Each of these outputs is associated with switching in each of the N dimensions, and hence is connected to the active switch of each of the sub-arrays of which a given switch module is a member. During switching, the appropriate dimension is selected based on the destination information, and then the transmission side active switch conveys the multiplexed fabric signal to the appropriate fabric active switch for switching in that dimensions. Since all N dimensions are accessible from a single fabric portion, in embodiments of the fourth aspect of the invention, it is possible to have fewer than N fabric portions per switch module. However, in preferred embodiments there are still at least N fabric portions, which provide for increased flexibility (see next paragraph) and improved bandwidth. When using fewer than N fabric portions, it is not possible to transfer signals in more than one sub-array in a given time slot. In embodiments having fewer than N fabric portions per switch module, it is preferable that the fabric portion employs more wavelengths of light in the multiplexed fabric signal in order to meet bandwidth requirements. In embodiments of the fourth aspect of the present invention having more than a single fabric portion per switch module, i.e. further including a second fabric portion for processing signals and communicating with other switch modules, the first electronic signal may be received from a receiving side output of the second fabric portion. Similarly the receiving side output may be for sending the signal to a transmission side input of the second fabric portion, as well as the first.

Where there are more than N fabric portions on each switch, flexibility is provided for extending the optoelectronic switch into higher dimensions. For example, consider the case of a 2D optoelectronic switch having $M^2$ modules organized in a square array. This could be extended into a 3D optoelectronic switch having $M^3$ switch modules organized in a cubic array (i.e. N layers of $N^2$ switches) by connecting the vacant fabric portions on each switch module having the same row and same column in each of the (newly-defined) layers via a new, e.g. active switch or set of passive routers, to define a new sub-array and associated active switch. Excess fabric ports may also be exploited by providing more than one fabric portion to connect a switch module to another switch module within the same sub-array.

The transmission side of the switch modules preferably also includes a transmission side packet processor, configured to receive the first electronic signal in the form of a packet having a packet header containing the destination information. In addition to the data itself, the information included in the packet may include information relating to the destination of that packet, e.g. the client portion to which the packet should be ultimately sent. The packet header may further include various pieces of information such as: source/destination address, packet length, protocol version, sequence number, payload type, hop count, quality-of-service indicator, and the like.

The transmission side packet processor may be configured to perform packet fragmentation, wherein packets of data having the same destination switch module are arranged into frames having a predetermined size, and wherein the packets of data may be split up into a plurality of packet fragments, arranged in a corresponding plurality of frames, and wherein optionally one frame may contain data from one or more packets of data.

Each packet fragment preferably has its own packet fragment header, which includes information at least identifying the packet to which that packet fragment originally belonged, so that the packet may be reconstructed after subsequent processing and transmission. For example, consider the case where the packet processor is configured so that the frame payload size is 1000B, and three packets of 400B, 800B and 800B are input into the switch module. If each of these were to be sent in separate frames, of one packet each, this would represent an efficiency of (400+ 800+800)/3000=67%. However, by using packet fragmentation, a first frame may include the 400B packet, and 200B of the first 800B packet, and then a second frame may include the second 800B packet and the remaining 200B of the first 800B packet. This leads to an efficiency of 100%. The frames that are constructed by this process represent packets of data in their own right, and so further fragmentation may occur at intermediate switch modules, when the packet undergoes more than one optical hop in order to reach the destination switch module.

In order to maximize efficiency, subsequent processing of a frame (e.g. forwarding said frame to be converted into the first plurality of optical signals) may not occur until the filling proportion of a frame reaches a predetermined threshold, preferably more than 80%, more preferably more than 90%, and most preferably 100%. The packets may alternatively be sent for subsequent processing after a predetermined amount of time has elapsed. In this way, if packets of data for a given switch module cease to arrive at the packet processor, a frame which is still below the threshold filling proportion may still be sent for subsequent processing rather than lying stagnant on the packet processor. The predetermined amount of time may be between 50 and 1000 ns, but is preferably between 50 and 200 ns. Most preferably, the time interval is around approximately 100 ns. Accordingly, the transmission side packet processor may include or be associated with a transmission side memory in which to temporarily store incomplete frames during their construction. The elapsed time may be varied depending upon traffic demand; typically, the higher the rate of traffic flow, the shorter will be the elapsed time and lower rates of traffic flow may lead to increased time intervals.

When the packet processor is configured to perform packet fragmentation, the receiving side of the first fabric portion may also include a receiving side packet processor, which is configured to recreate the original packets from the packet fragments, when the original packets are spread over more than one frame. This may be done with reference to the packet fragments headers described above. When a packet undergoes several separate fragmentations by successive intermediate switch modules on its journey from source to destination, final reassembly of the packet by the receiving side packet processor may be delayed until all of the constituent parts of the original packet have arrived at the destination switch module. Accordingly, the receiving side packet processor may include or be associated with a receiving side memory in order to temporarily store the constituent parts.

The modulator may be configured to receive light from a light source associated with that modulator. More preferably, the transmission side of the first fabric portion includes a plurality of modulators, and specifically optical modulators. The optical modulators may be phase or intensity modulators, for example electro-absorption modulators (EAMs), Franz-Keldysh modulators, modulators based upon the quantum confined Stark Effect, Mach-Zehnder modulators. The plurality of modulators preferably includes 8 modulators. Each modulator may be associated with a single light source only or may be lit by fewer light sources, where the light sources are shared between modulators. Each modulator may be configured to receive an electronic signal from the transmission side input or the transmission side packet processor, and unmodulated light from the light source. By combining the two, the modulator generates a modulated optical signal having the same wavelength as the unmodulated light from the light source, and carrying the information carried by the original electronic signal. This modulated optical signal may then be transmitted to the transmission side multiplexer. The light source is preferably in the form of a laser, in order to generate a substantially monochromatic beam of light restricted to a narrow band of wavelengths. In order to minimize losses, the modulators are preferably configured to receive light having a wavelength in the C-band or L-band of the electromagnetic spectrum, i.e. from 1530 nm to 1625 nm. More preferably, the light has a wavelength falling within the C-band or "erbium window", having a wavelength from 1530 nm to 1565 nm.

In embodiments of the first aspect of the invention, the light source is preferably a variable-wavelength light source, and more preferably a tunable laser. Furthermore, in embodiments of the first aspect of the invention, there is preferably a tunable laser associated with each of the modulators in the plurality of modulators. This ensures that a different wavelength of light may be selected for each modulator, depending on the destination information stored in the signal which is modulated by that modulator.

In embodiments of the second and fourth aspects of the invention, which employ wavelength-division multiplexing, there is similarly a separate light source associated with each modulator in the array of modulators. However, since the routing is carried out by an active switch rather than a passive router, there is no need to vary the wavelength of the modulated signal. So, it is preferable in embodiments of the second aspect of the present invention for the light sources to be fixed-wavelength light sources, which are less expensive and more widely available. In an array of modulators, the light source associated with each modulator should have a different wavelength, with non-overlapping bandwidths, in order to minimize crosstalk in the multiplexer.

In embodiments of the third aspect of the invention, it is preferable that each modulator shares a light source. In order to select the correct outputs of the set of passive routers, which as discussed above, are preferably CAWGs, it is also advantageous to be able to vary the wavelength of the light to be modulated. Thus, a variable-wavelength light source, preferably a tunable laser, is used in preferred embodiments of this aspect of the invention.

When the light source is a laser, the modulator may be in the form of an electro-absorption modulator (EAM), which uses a changing electric voltage to modulate the intensity of the laser light to carry the information contained in an electronic signal. Using an EAM means that only the intensity of the laser light is changed, rather than the frequency, and thus prevents any change in the wavelength of the modulated optical signal, i.e. as featured in the first plurality of optical signals.

When there are a plurality of modulators, the transmission side packet processor may also be configured to perform packet slicing, wherein a frame (as constructed by the packet fragmentation process described above) or a packet of data is sliced into a first plurality of electronic signals. Each of the first plurality of electronic signals is then sent to a different modulator in the plurality of modulators, whereby they are converted into the first plurality of optical signals.

The photodetector may include a photodiode for converting the second plurality of optical signals into a second plurality of electronic signals. More preferably, the receiving side may include a plurality of photodetectors. The receiving side packet processor may be configured to recombine the second plurality of electronic signals, each representing packet slices, into the second electronic signal. By dividing the packet or frame into a plurality of slices before sending to another switch module, the data can be sent using a number of different wavelengths which are multiplexed into a single optical link by the multiplexer (i.e. in embodiments of the third and fourth aspects of the present invention). Alternatively, in embodiments of the second aspect of the invention, by slicing the signal and sending it across the set of passive routers, the result parallelism effect provides for a greater bandwidth. In other words several pieces of information can be sent in parallel leading to more efficient data transfer.

In the event where the transmission side packet processor is configured to perform both packet slicing and packet fragmentation, the packet fragmentation step (i.e. the formation of frames of data) occurs first, followed by slicing of the frame. Correspondingly, on the destination (or intermediate) switch module which receives the signal, the packet processor recombines the second plurality of electronic signals (i.e. packet slices) into a single second electronic signal before the original packets are reconstructed from the frames.

After fragmentation, frames are constructed which each contain data having intended only for a single destination switch module. After this, data is converted into the first plurality of optical signals which may differing in wavelength according to some aspects of the present invention.

Preferably, the switch module is configured to operate in burst mode, wherein the switch module is configured to send the plurality of optical signals to the fabric (or, in some embodiments via the multiplexer) in successive bursts, each burst including packets and/or packet fragments from a single frame of data, and such that each burst includes only packets and/or packet fragments having the same destination module. Each successive burst may comprise a frame of data having a different destination switch module. Pairs of sequential bursts may be separated by a predetermined time interval, which may be between 50 and 1000 ns, but is preferably between 50 and 200 ns. Most preferably, the time interval is around approximately 100 ns. Preferably, all of the fabric portions in a single sub-array are configured to operate synchronously, i.e. each fabric portion sends a burst to the fabric at the same time.

The transmission side packet processor may also be configured to carry out error correction on incoming packets of data. This may be done by means such as error detection and retransmission or forward error correction (FEC). Additionally, the switch module may also include a management portion, which is configured to perform fabric management processes including initialization, programming routing/forwarding tables, fault reporting, diagnostics, statistics reporting and metering.

The following paragraphs refer in particular to the control aspects of the second and fourth aspects of the present invention. In order to control the switching of the data across the fabric, each sub-array of switch modules may include an arbiter, which is configured, to the extent that it is possible, to control the operation of the active switch(es) or the switch modules which may be present in that sub-array, based on the destination information stored in packets of data to be switched. Similarly in the first and third aspects, an arbiter may be present, in order to control the switch modules themselves, to ensure that optical signals are sent so as to be maximally non-blocking. This allows the provision of a route which ensures that all data reaches its destination in a non-blocking fashion, and minimizes the occurrence of bottlenecks. The arbiter may be connected to a switch driver which controls the operation of the active switches. The arbiter may be connected to a transmission side packet processor in each switch module of the sub-array in which it is included. Alternatively, each fabric portion of each switch module may further include a controller, via which the arbiter may be connected to the transmission side packet processor. When a packet of data is received at the transmission side packet processor, the transmission side packet processor is configured to send a request to the arbiter, the request preferably identifying the destination switch module of a packet of data. The transmission side packet processor may lookup, in a lookup table or otherwise, which output of the active switch to which it is connected corresponds to the destination switch module which is the subject of the request. More specifically, the output which is connected either to that destination switch module or an intermediate switch module to which the next optical hop should occur, and then requests that output itself, to the arbiter.

Accordingly, one or both of the transmission side packet processor and the arbiter may include a lookup table, containing information relating switch modules in the sub-array to the $R_i$ outputs of the active switch. When the request is made, the arbiter then establishes a scheme which ensures that, to the greatest extent possible, that each packet is able to perform its next optical hop. More specifically, the arbiter may be configured to perform a bipartite graph matching algorithm in order to calculate pairings between the $R_i$ inputs and the $R_i$ outputs of the active switch, such that each input is paired with at most one output and vice versa. Naturally, in some cases, where e.g. several fabric portions send large amounts of data all of which is intended for the same output of the active switch, the request cannot be met. Accordingly, the arbiter may be configured to store information relating to requests that cannot be met, in a request queue. Then, until these requests are met, the associated data is buffered on the switch module, e.g. in the transmission side packet processor or in a separate transmission side memory. In this way, requests that cannot be met are delayed rather than dropped, e.g. when a local bottleneck occurs at the active switch. In other words, the arbiter maintains the state of a buffer memory or a virtual output queue (VOQ) on the switch modules, this state can be in the form of counters (counting e.g. the number of packets or bytes per VOQ), or in the form of FIFOs (first-in, first-out) that store packet descriptors. However, the actual packets themselves remain stored on the switch module rather than at the arbiter.

When it is necessary for a packet to perform more than one hop in order to reach its destination switch module, the route may be deduced entirely from a comparison between the coordinates of the source switch module and the destination switch module. For example, in a process known as dimension ordered routing, the first hop may match the first coordinate of the source and destination switch modules, the second hop may match the second coordinate of the source and destination switch modules and so on, until all of the coordinates match, i.e. until the packet has been transferred to the destination switch module. For example, in a four-dimensional network, if the source switch module were to have coordinates (a, b, c, d) and the destination switch module were to have coordinates (w, x, y, z), then the dimension-ordered route might be: (a, b, c, d)→(w, b, c, d)→(w, x, c, d)→(w, x, y, d)→(w, x, y, z). At any point along the route, the packet processor may compare the coordinates of the source switch module against the coordinates of the destination switch module, and determine which coordinates do not yet match. Then it will decide to route along the non-matching directions, e.g. with the lowest index, or the highest index.

In embodiments of the second and fourth aspects of the present invention, one, some or all of the active switches may be in the form of an optical active switches. Such an optical active switch may be based on an arrangement of Mach-Zehnder interferometers (MZIs) and more specifically may be in the form of an MZI cascade switch. An MZI cascade switch includes a plurality of MZIs, each having two arms which split at an input coupler, with two arms feeding the split paths into an output coupler where they are recombined, and two output portions. The plurality of MZIs are preferably arranged to provide a pathway from each input to each output of the MZI cascade switch. To the greatest extent possible the arms have the same length. Alternatively, where it is desirable to have a default output, the arms may be unbalanced. Each MZI may include an electro-optical region at one or both arms, in which the refractive index depends on a voltage applied to the region via one or more electrodes. The phase difference of light travelling through the electro-optical region can therefore be controlled by application of a bias via the electrodes. By adjusting the phase difference, and therefore the resulting interference at the output couple, the light can be switched from one output of the MZI to the other. Preferably, the MZI cascade switch has $R_i$ inputs and $R_i$ outputs, and these may be made up, for example, of a plurality of 1×2 and 2×1 MZIs, arranged to provide a pathway from each input to each output. A MZI cascade switch, or any other active switch such as this is beneficial over a full mesh for connecting $R_i$ interconnecting switch modules when $R_i$ is 5 or more, since a full mesh requires $\frac{1}{2} \cdot R_i(R_i-1)$ optical fibers to connect all of the fabric portions, whereas an active switch requires only 2Ri optical fibers. It is possible to create an MZI cascade switch with Ri=2n inputs and outputs by building Ri "1×$R_i$ demux trees" and $R_i$ "$R_i$×1 mux trees", wherein each tree includes n stages of 1×2 (demux) or 2×1 (mux) switches, with 2 k switches at the kth stage. An additional port may be supported on each cascade switch by building $R_i$+1 trees on each side and omitting an internal connection so that an input is not connected to the output which is connected to the same switch as itself. An MZI cascade switch such as this is largely wavelength-agnostic, and so is able to switch the whole multiplexed fabric output signal from input to output without requiring any demultiplexing/multiplexing at the inputs and outputs.

Alternatively, the active switch(es) may be in the form of an electronic active switch, such as an electronic crossbar switch. More preferably, the electronic active switch may be an electronic shared memory switch. An electronic shared memory switch is an electronic crossbar switch which also includes a memory. The presence of a memory within the switch is advantageous since it means that the switch can perform not only switching, but also buffering, i.e. storing a queue of packets when a bottleneck arises at the electronic shared memory switch, as described above. This means that the electronics on the packet processors can be simplified.

In order to use an electronic, rather than optical active switch in the architecture of the present invention, the multiplexed fabric signal must be converted into a signal which can be switched electronically. Accordingly, the electronic active switch may include an optical-to-electrical converter at each input for converting the multiplexed fabric signal from an optical signal to an electronic active switching signal; and an electrical-to-optical converter at each output for converting the electronic active switching signal to an optical signal in the form of the multiplexed fabric signal, wherein the electronic active switch is configured to switch the electronic active switching signal from any of its $R_i$ inputs to any of its $R_i$ outputs. Furthermore, in order to deal with the multiplexed nature of the signals, the optical-to-electrical converter may include a demultiplexer for demultiplexing the multiplexed fabric output signal into a first plurality of intermediate optical signals, each of which is converted, preferably by a corresponding plurality of photodetectors, into an intermediate electronic active switching signal for switching to the desired output, and the electrical-to-optical converter may be configured to convert the plurality of switched intermediate electronic active switching signals into a second plurality of intermediate optical signals, and further includes a multiplexer for multiplexing said second plurality of intermediate optical signals to form the multiplexed fabric input signal. In preferred embodiments, the electronic active switch may be configured to temporarily store a queue of packets or frames of data when a request relating to said packets or frames cannot be met.

Any or all of the multiplexer, transmission side multiplexer, demultiplexer and receiving side demultiplexer is preferably in the form of an arrayed waveguide grating (AWG), which is a passive device. An AWG allows a plurality of optical signals of different wavelengths to be carried along a single optical fibre. Because the wavelengths of the plurality of modulated optical signals produced by the modulators are all different, the multiplexed fabric signal produced by the AWG suffers from little to no crosstalk, since light of different wavelengths interferes only linearly. Alternatively, instead of an AWG, the multiplexed signal may be broadcast to a number of wavelength-selective filters, each tuned to receive a wavelength of one of the desired split signals.

An important consideration in switching systems such as the switch of the present invention is that of bandwidth. In the following discussion "bandwidth" is used to refer to the maximum rate of data transfer of which a particular portion is capable, and is typically measured in gigabits per second (herein abbreviated to "Gbps") Specifically, it is important to ensure that there is a conservation of bandwidth on both a local and global scale. In order to ensure that it is not possible for more data to enter a switch module in a given time than can be transmitted away from the switch module in the same time (i.e. resulting in a bottleneck which is localized onto that switch module), the total bandwidth of the client portions on a switch module preferably does not exceed the total bandwidth of the fabric portions on the same switch module. More preferably, the total bandwidth of the fabric portions on a switch module exceeds the total bandwidth of the client portions on the same switch module, and most preferably, the bandwidth of each fabric portion on a switch module exceeds, or is equal to, the total bandwidth of all of the client portions on that switch module. In this way, local bottlenecks caused by an unexpectedly large volume of incoming data from a plurality of client portions, all directed to the same fabric portion on the same switch module, can be avoided. In particular, this allows all signals to be multiplexed together for subsequent transmission in a non-blocking fashion.

In a preferred embodiments of aspects of the present invention, the active switches, or passive routers may be located on or in, and preferably connected to an optical backplane. Preferably, the backplane contains the optical links for connecting the switch modules to the active switches or passive routers, thus providing the connections between each switch module and each active switch/passive router with which each of said switch modules shares a sub-array. More specifically, each of the optical links may provide a connection for conveying the multiplexed fabric output signal between a transmission side multiplexer on a switch module and an input of a passive router/active switch. When a backplane is used in conjunction with optical active switches as described above, or the like, an active optical backplane module (AOBM) may be used. The switch modules may be separable or detachable from the backplane, so that they can be rearranged, depending on the external requirements. Accordingly, the switch modules may also include a connection means for connecting to the optical backplane. The connection means may include arrays of single mode optical fibres, linked with MPO connectors or similar.

According to a fifth aspect of the present invention, an optoelectronic switch is provided, for transferring an optical signal from an input device to an output device, the optoelectronic switch including an array of interconnected switch modules, which are interconnected by an interconnecting fabric, wherein:
the switch modules are arranged in an N-dimensional array, the $i^{th}$ dimension having a size $R_i$ (i=1, 2, ..., N), each switch module having an associated set of coordinates giving its location with respect to each of the N dimensions;
each switch module is a member of N sub-arrays $S_i$, each sub-array $S_i$ comprising $R_i$ switch modules whose coordinates differ only in respect of their location in the $i^{th}$ dimension, and each of the N sub-arrays being associated with a different dimension, and
each switch module has:
a client portion for connecting to an input device and/or an output device;
a first fabric portion and a second fabric portion, configured to process signals and communicate with other switch modules, each of the first fabric portion and the second fabric portion having a transmission side and a receiving side,
wherein the transmission side of the first fabric portion includes:
a transmission side input for receiving a first electronic signal carrying destination information about a destination switch module for the first electronic signal, the first electronic signal received from either:
a receiving side output of the second fabric portion or
an input device, via the client portion;
a modulator for converting said first electronic signal into a first plurality of optical signals containing the same information, the wavelength of each of the first plurality of optical signals selected based on the destination information;
wherein the receiving side of the first fabric portion includes:
a photodetector for converting a second plurality of optical signals received from the fabric into a corresponding second electronic signal; and
a receiving side output for sending the second electronic signal to either:
a transmission side input of the second fabric portion, or
an output device, via the client portion
wherein the fabric includes a passive router optically connected between a transmission side of a fabric portion of a first switch module in a given sub-array and a receiving side of a fabric portion of another switch module in the same sub-array.

According to a sixth aspect of the present invention, an optoelectronic switch for transferring an optical signal from an input device to an output device is provided, the optoelectronic switch including an array of interconnected switch modules, which are interconnected by an interconnecting fabric, wherein:
the switch modules are arranged in an N-dimensional array, the ith dimension having a size Ri (i=1, 2, ..., N), each switch module having an associated set of coordinates giving its location with respect to each of the N dimensions;
each switch module is a member of N sub-arrays Si, each sub-array Si comprising Ri switch modules whose coordinates differ only in respect of their location in the ith dimension, and each of the N sub-arrays being associated with a different dimension, and
each switch module has:
a client portion for connecting to an input device or an output device;
a first fabric portion and a second fabric portion, each for processing signals and communicating with other switch modules, the first fabric portion having a transmission side and a receiving side,
wherein the transmission side of the first fabric portion includes:
a transmission side input for receiving a first electronic signal carrying destination information about a destination switch module for the first electronic signal, the first electronic signal received from either:
a receiving side output of the second fabric portion or
an input device, via the client portion;
a modulator for converting said first electronic signal into a first plurality of optical signals containing the same information;
a transmission side active switch for directing the first plurality of optical signals towards their destination switch module based on the destination information;
wherein the receiving side of the first fabric portion includes:
a receiving side active switch for directing signals from the fabric to a receiving side input;
a photodetector for converting a second plurality of optical signals from the receiving side input into a corresponding second electronic signal; and
a receiving side output for sending the second electronic signal to either:
a transmission side input of the second fabric portion, or
an output device, via the client portion.

Other aspects of the present invention provide methods of switching an optical signal from an input device to an output device, for example using optoelectronic switches according to the first, second, third, fourth, fifth and sixth aspects of the present invention. In the definitions below the source and destination switch modules refer to the starting point and the end point of an individual "hop", rather than the original source and the final destination of the data, packet of data or frame of data.

In one aspect, a method may be provided for switching an optical signal from an input device to an output device using an optoelectronic switch according to a first aspect of the invention, the method including the steps of:

receiving, at a transmission side input of a source switch module, a first electronic signal containing information including destination information about a destination switch module for said first electronic signal, the first electronic signal being received from either:

a receiving side output of the second fabric portion of the source switch module, or an input device, via the client portion of the source switch module;

converting said first electronic signal into a first plurality of optical signals containing the same information, the wavelength of each of the first plurality of optical signals selected based on the destination information;

routing the plurality of optical signals towards the destination switch module using a transmission side passive router, the path of an optical signal through said passive router dependent on the wavelength of that optical signal;

generating a second plurality of optical signals from an output of the transmission side passive router, using a receiving side passive router on the destination switch module, the path of an optical signal through the receiving side passive router dependent on the wavelength of that optical signal;

converting the second plurality of optical signals into a corresponding second electronic signal;

sending, from a receiving side output of the destination switch module, to either:

a transmission side input of the second fabric portion of the destination switch module, or an output device, via the client portion of the destination switch module.

In another aspect, a method may be provided for switching an optical signal from an input device to an output device using an optoelectronic switch according to a second aspect of the invention, the method including the steps of:

receiving, at a transmission side input of a source switch module, a first electronic signal containing information including destination information about a destination switch module for said first electronic signal, the first electronic signal being received from either:

a receiving side output of the second fabric portion of the source switch module, or an input device, via the client portion of the source switch module;

converting said first electronic signal into a first plurality of optical signals containing the same information;

multiplexing the first plurality of optical signals into a multiplexed fabric signal;

transmitting the multiplexed fabric signal using the transmission side active switch of the source switch module, the output of the transmission side active switch to which the multiplexed fabric signal is directed being selected based on the destination information;

receiving the multiplexed fabric signal at an input of the receiving side active switch of a destination switch module, and directing the multiplexed fabric signal to the output of the receiving side active switch;

demultiplexing the multiplexed fabric signal, to generate a second plurality of optical signals;

converting the second plurality of optical signals into a corresponding second electronic signal;

sending, from a receiving side output of the destination switch module, to either:

a transmission side input of the second fabric portion of the destination switch module, or an output device, via the client portion of the destination switch module.

In another aspect, a method may be provided for switching an optical signal from an input device to an output device using an optoelectronic switch according to the third aspect of the invention, the method including the steps of:

receiving, at a transmission side input of a source switch module, a first electronic signal containing information including destination information about a destination switch module for said first electronic signal, the first electronic signal being received from either:

a receiving side output of the second fabric portion of the source switch module, or an input device, via the client portion of the source switch module;

converting said first electronic signal into a first plurality of optical signals containing the same information;

sending each of the first plurality of optical signals to an input of a respective passive router which is part of the set of passive routers associated with the sub-array containing the source and destination switch modules;

routing the first plurality of optical signals to the destination switch module using the set of passive routers, the outputs of which form a second plurality of optical signals;

converting the second plurality of optical signals into a corresponding second electronic signal;

sending, from a receiving side output of the destination switch module, to either:

a transmission side input of the second fabric portion of the destination switch module, or an output device, via the client portion of the destination switch module.

In another aspect, a method may be provided for switching an optical signal from an input device to an output device using an optoelectronic switch according to a fourth aspect of the invention, the method including the steps of:

receiving, at a transmission side input of a source switch module, a first electronic signal containing information including destination information about a destination switch module for said first electronic signal, the first electronic signal being received from either:

a receiving side output of the first fabric portion of the source switch module, or an input device, via the client portion of the source switch module;

converting said first electronic signal into a first plurality of optical signals containing the same information;

multiplexing the first plurality of optical signals into a multiplexed fabric signal;

transmitting the multiplexed fabric signal using the transmission side active switch of the source switch module, to one of the N fabric active switches included in the N sub-arrays of which the source switch module is a member, the selection of the fabric active switch based on the destination information;

transmitting the multiplexed fabric signal using the selected fabric active switch to a receiving side active switch on the destination switch module, and directing the multiplexed fabric signal to the output of the receiving side switch module;

demultiplexing the multiplexed fabric signal, to generate a second plurality of optical signals;

converting the second plurality of optical signals into a corresponding second electronic signal;

sending, from a receiving side output of the destination switch module, to either:
 a transmission side input of the first fabric portion of the destination switch module, or
 an output device, via the client portion of the destination switch module.

Other aspects of the invention also provide individual switch modules such as those employed in any of the first to sixth aspects of the present invention, as defined above.

Further optional features of the invention are set out below.

BRIEF DESCRIPTION OF THE DRAWINGS

Embodiments of the invention will now be described by way of example with reference to the accompanying drawings in which:

FIG. 4A shows the path of data when being switched between two switch modules in a given sub-array, according to embodiments of the second aspect of the present invention.

FIG. 6A shows the path of data when being switched between two switch modules in a given sub-array, according to embodiments of the third aspect of the present invention.

DETAILED DESCRIPTION AND FURTHER OPTIONAL FEATURES OF THE INVENTION

It should be noted in the description below that the terms "switch module" and "OPPM (optical packet processing module)" are used interchangeably.

Figure 1:
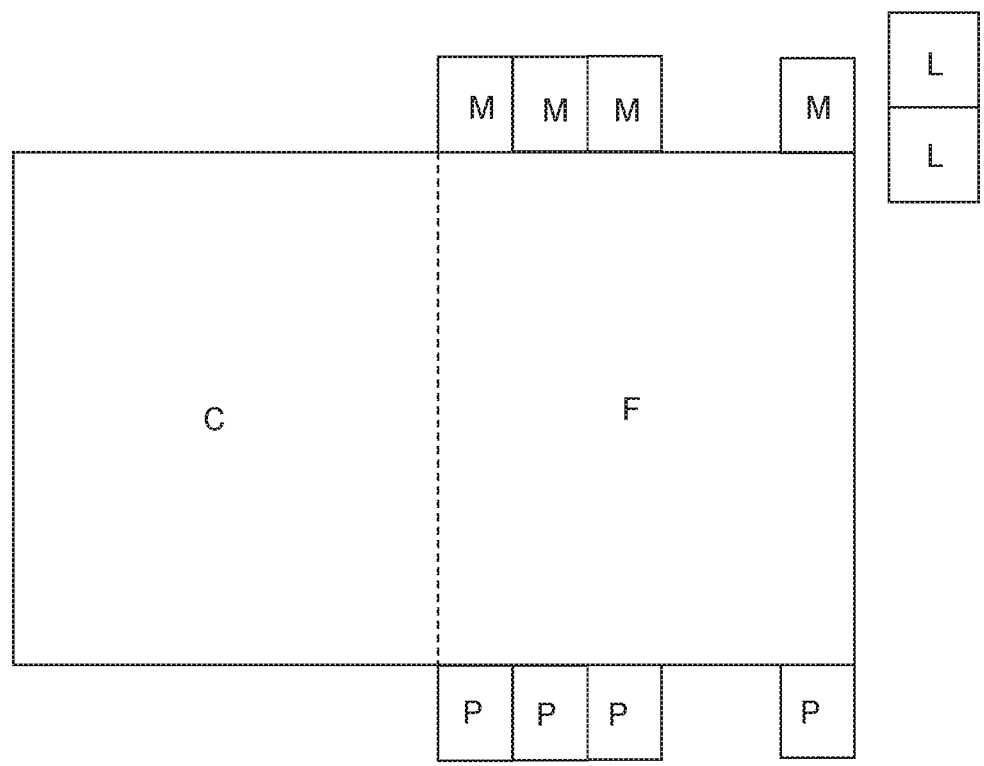
FIG. 1 shows a schematic diagram including the basic features of a switch module according to embodiments of the present invention.

FIG. 1 shows the basic structure of a switch module, or optical packet processing module (OPPM; the terms are used interchangeably throughout the description), which may be employed in embodiments of the present invention. The OPPM shown in FIG. 1 is has a client side C and a fabric side F. For the purposes of describing the present invention, these two sides may be considered to be independent from each other. The fabric side includes optical fabric ports (not shown) which, in embodiments of the invention are connected to the interconnecting fabric. The client side includes client ports for connecting to external inputs and outputs, i.e. to external devices between which it is desired to switch signals. In the embodiment of the invention shown in FIG. 1, the fabric side of the OPPM includes an array of photodetectors P (only 4 are shown for simplicity, but it will be understood that the array may contain more or less than this), and a corresponding plurality of electro-absorption modulators (EAMs) M (again, only four shown). The input into each EAM M comes from a laser L. The outputs of each EAM are multiplexed onto a single optical fibre (described in more detail elsewhere). In order to prevent interference between the signals which are multiplexed into the optical fibre, each EAM operates a different wavelength, and therefore requires a different laser input. Depending on the physical layout of the optoelectronic switch including the OPPM, EAMs belonging to different OPPMs may share a single laser as its light source.

Together, the photodetectors P, EAMs M and laser L form a detector-remodulator (DRM) arrangement, whereby an input signal which is detected by the photodetector P is applied to a carrier signal having a different wavelength from the wavelength of the input signal. The wavelength of the carrier is determined by, for example, electronics on the OPPM itself (e.g. when the laser is a tunable laser TL). Even in cases where the laser is not tunable, it is still possible for the output signal to leave on a different wavelength from that which it came in on. The EAM modulates the laser into put apply the required data signal to the laser light and then outputs it from the OPPM from a fabric output to which it is connected. In this arrangement, the input signal is detected in the optical domain, and is then processed in the electrical domain (involving steps such as packet reception, packet parsing, classification, routing lookup, port selection, switching, packet header/trailer updates, transmission), before being converted back into the optical domain for subsequent transmission.

Hypercube Architectures—RPFab0; RPFab2

In some embodiments of the present invention, the switch modules or OPPMs are arranged using topologies/architectures which may be referred to as "hypercubes" or "generalized hypercubes", and they operate using the concept of a full-mesh. A schematic diagram illustrating the concept of these topologies is provided in FIG. 2, which shows a 2-dimensional example of a hypercube topology. Here, nine OPPMs are arranged into three rows and three columns, and each have four fabric ports (shown on the top of the OPPMs) and two client ports (shown on the bottom of the OPPMs, and not discussed further). The curved lines represent the connections between the fabric ports of the array of OPPMs. In a 1-dimensional hypercube-style network, each OPPM includes a direct connection to each other OPPM in the network, i.e. there is a full mesh. This is modified in the network shown in FIG. 2.

Rather than having a connection to every OPPM in the whole network, each OPPM is only connected to each of the other OPPMs in the same row or column (i.e. in each the sub-array) as itself, or in other words, full-mesh interconnectivity is provided within each sub-array, but not in the whole array. As discussed above, all of the connections shown are via the fabric ports. A signal may be sent from any OPPM to any other OPPM in the network in a maximum of two "hops", e.g. a first hop to an intermediate OPPM in the same row followed by a second hop to an OPPM in the same column as the intermediate OPPM. It is the ability of all of the OPPMs in the array to act as intermediate OPPMs, i.e. signals can be forwarded from one fabric port to another fabric port, which allows the arrays of the present invention to be multidimensional and highly-scalable. This can be generalized to N dimensions, wherein the maximum number of hops required is N.

RPFab0

Figure 2:
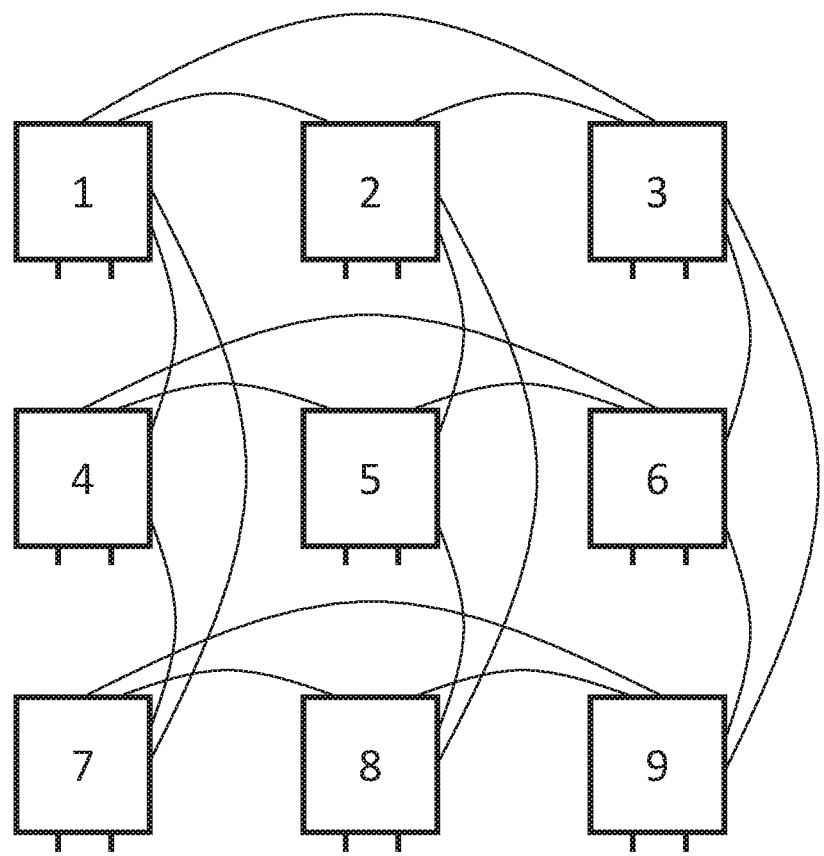
FIG. 2 shows a schematic network diagram illustrating the generalized hypercube-like topology employed in embodiments of the first and second aspects of the present invention.
Figure 3A:
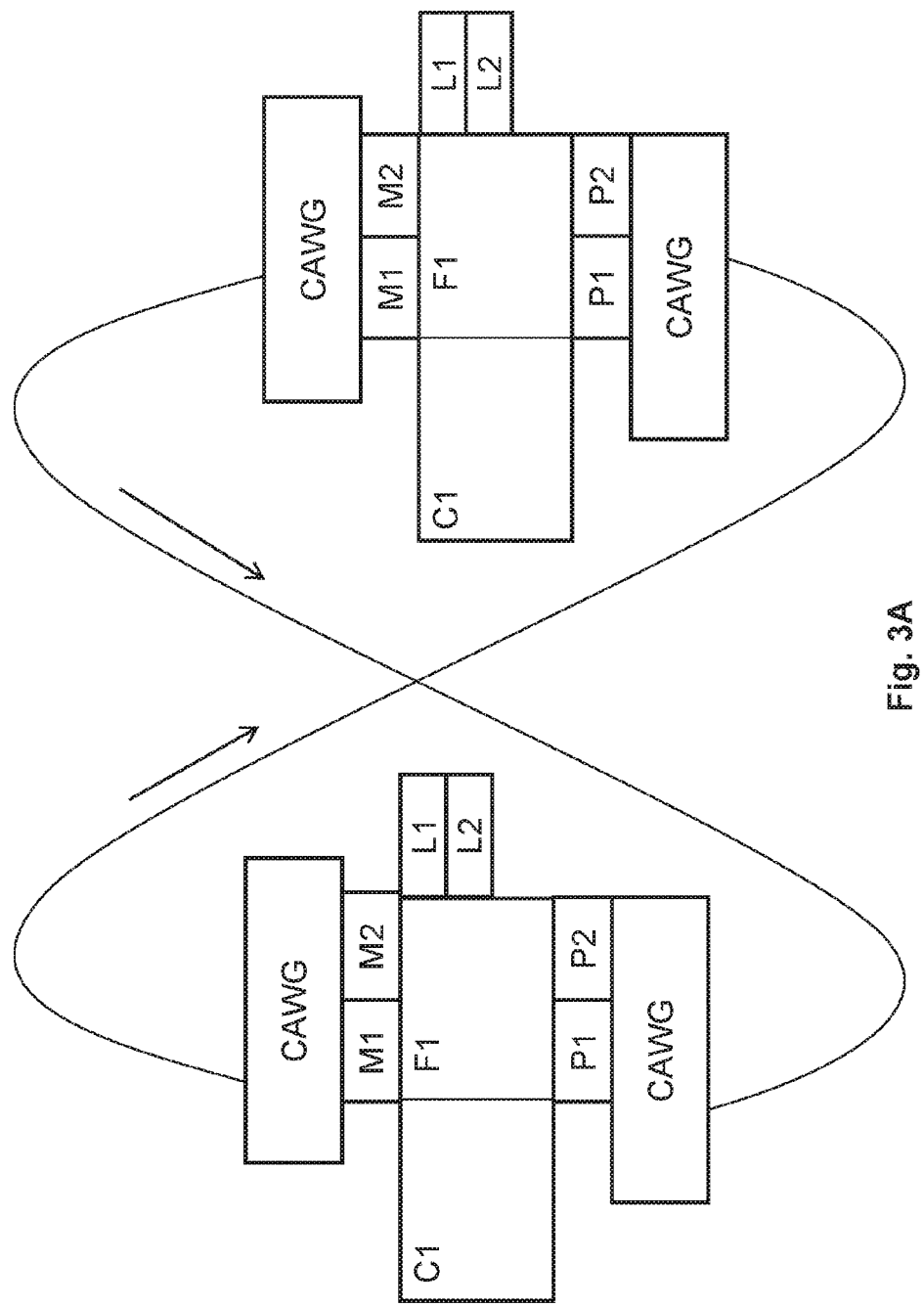
FIG. 3A shows the path of data when being switched between two switch modules in a given sub-array, according to embodiments of the first aspect of the present invention.

FIG. 3A shows a schematic drawing of the path taken by a signal between a source and destination according to some embodiments of the present invention. The arrangement shown may be referred to herein as "RPFab0". In addition to the general features of the OPPMs which were described with reference to FIGS. 1 and 2, outputs of the EAMs M are connected to a cyclic arrayed waveguide grating (CAWG). Similarly, the inputs to the photodetectors P are also connected to a CAWG. In this embodiment, each EAM is connected to a tunable laser TL. Thus, during transmission, the signal is converted to a wavelength which is dependent on its destination OPPM, the conversion being performed by a combination of the EAM and TL, and the selection of the appropriate wavelength being performed by electronics on the OPPM (described in more detail elsewhere). The signal then passes through the CAWG, which routes it towards a photodetector of the correct OPPM. The properties of the CAWG are such that the output of the CAWG from which the signal emerges is dependent on the wavelength and the input of the CAWG. Accordingly, signals having the same OPPM are multiplexed onto the same CAWG output. RPFab0 exploits the cyclic nature of CAWGs by utilizing both multiple channels within a band (to select the output port) and also multiple bands (in order to multiplex signals together). The lasers for wavelengths constituting one port must be tuned so that they fall into separate bands which are switched onto the same output port of the CAWG.

As mentioned previously, in this embodiment, which represents a 1-dimensional case, the so-called "fabric" is in the form of a full mesh of optical fibres, i.e. a fibre from each OPPM is connected to every other switch module. This may be referred to as a "passive fabric", which performs no active switching function itself. Rather, it acts only as a medium through which the signals pass. It is straightforward to see how the simple, two-OPPM structure shown in FIG. 3A may be extended into two or more dimensions, by the inclusion of more fabric ports on each OPPM.

Figure 3B:
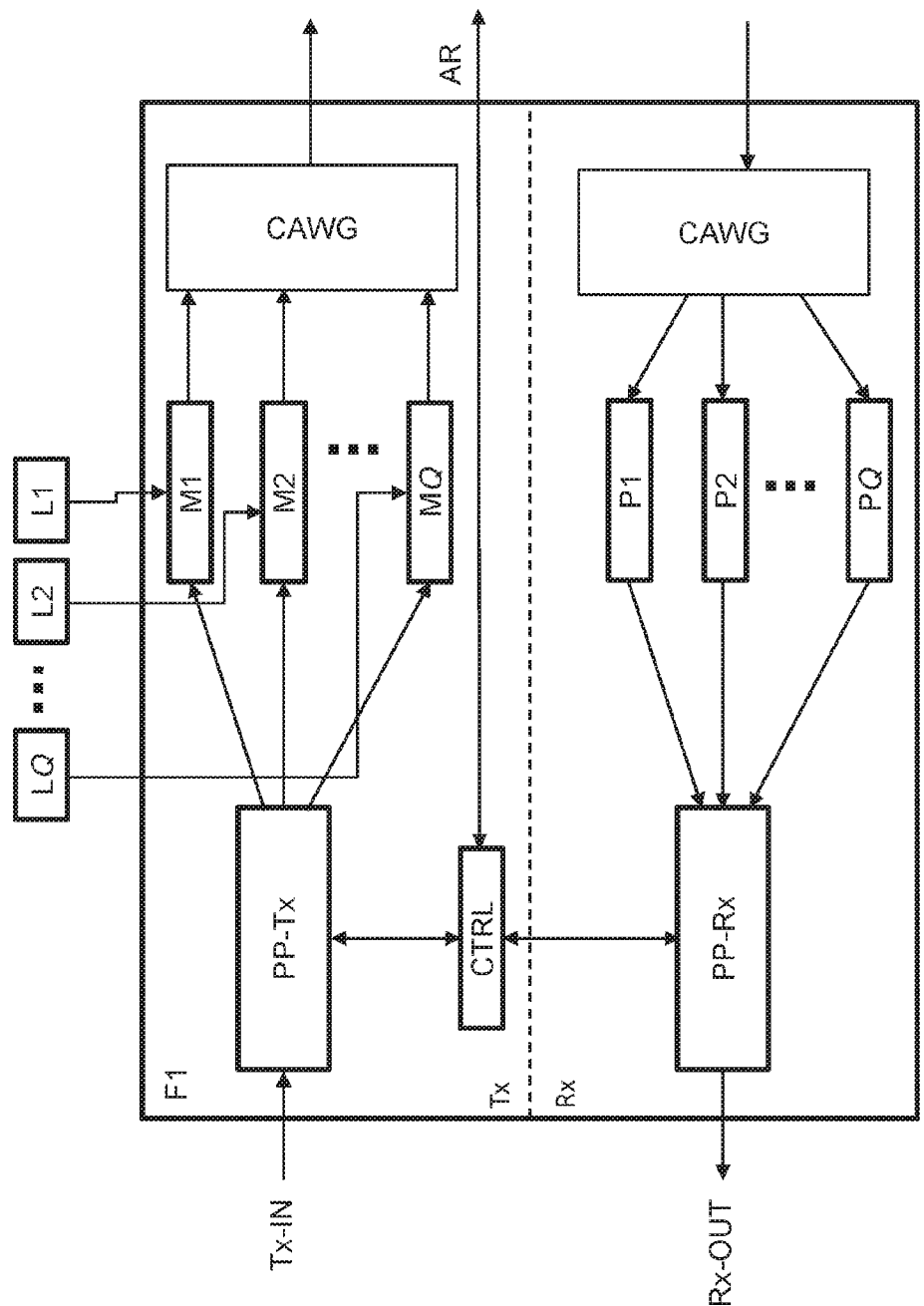
FIG. 3B shows a more detailed schematic diagram of a switch module as shown in FIG. 3A.

FIGS. 3A and 3B shows a schematic diagram of the path which a signal may take in the above-described embodiment of the invention. Here, an optical signal is received at a packet processor PP, e.g. from the client side of the OPPM. This signal is then processed (discussed in more detail elsewhere), and modulated onto a signal having a selected wavelength (the selection of said wavelength being controlled by the packet processor PP). Then the signal passes into a CAWG, which selects an output based on the selected wavelength, and transmits the signal via the fabric (clearly, not all of the full-mesh is shown in FIG. 2), to a CAWG connected to a photodetector P of the destination OPPM. It is noted that more than one signal may be carried on the same optical fibre (i.e. a multiplexed or WDMed signal), which is then demultiplexed by the CAWG attached to the photodetector. The photodetector then converts the signal to an electrical signal, whereupon further packet processing takes place, before the signal is output to either: a client side of the OPPM, or perhaps to another fabric port on the same OPPM for subsequent re-processing and re-transmission.

Fabric side F1 (also "first fabric portion") is divided into two parts, a transmission side (referred to herein as "Tx") and a receiving side (referred to herein as "Rx"). Tx includes a packet processor PP-Tx, which receives signals from a transmission side input Tx-IN, and an array of EAMs labelled M1, M2 etc, each of which receives an input from a corresponding light source labelled L1, L2 etc. An output of each of the EAMs forms an input to a CAWG. Rx also includes a CAWG. The outputs of the Tx CAWGs and the inputs of the Rx CAWGs provide the full-mesh connectivity between the OPPMs in a given sub-array, as shown e.g. in FIG. 2. Each output of the Rx CAWG is incident on one the photodetectors labelled P1, P2 etc. The outputs of the photodetectors P1, P2 etc. feed into an input of the receiving side packet processor PP-Rx, which itself feeds into the receiving side output Rx-OUT.

The path of an optical signal from source OPPM to destination OPPM will now be described in depth with reference to FIG. 3B. In the present example, the full journey of an optical signal from an input device to an output device will be described. An optical signal in the form of a packet of data from an input device, e.g. a host or a server is incident upon the client side C1 (not shown), whereupon it is converted into an electronic signal using e.g. a photodiode (not shown) of the OPPM. From here the (now electronic) packet passes to the transmission side input Tx-IN. In the present embodiment, the packet then passes into the transmission side packet processor PP-Tx. Here, based on information relating to the destination OPPM or OPPMs of that packet of data (stored e.g. in the packet header), the payload is divided into frames, each frame containing only data with the same destination OPPM. It should be noted that destination OPPM here may refer either to the overall destination of the packet or the next-step in its journey, in instances where the data must be sent using more than one hop. When a frame associated with a particular destination OPPM is full to a certain threshold (or after a predetermined amount of time has elapsed), the packet processor slices that frame into a set of Q electronic signals, each of which is then directed to a different one of the Q EAMs M1, M2 . . . MQ shown in FIG. 3B. Each modulator M1, M2 etc. receives input from a light source L1, L2 etc. in the form of a laser beam onto which the signal is modulated. In RPFab0, the light sources are tunable lasers. Each of the Q modulators M1 to MQ receives a light input having a different wavelength, and the set of (modulated) optical signals from the modulators M1 to MQ are incident on the Q inputs of the Tx CAWG. Due to the properties of CAWGs (and other similar passive routers), the output to which a signal is routed depends both on the wavelength of the signal and the input at which it arrives. Accordingly, the set of wavelengths chosen for M1 to MQ is such that all of the optical signals converge at a single output of the CAWG. Because the wavelengths are selected to be evenly spaced, the crosstalk/interference between the signals within the CAWG is minimized when they are routed into the same output optical link of the CAWG.

The signal output from the Tx CAWG is then incident upon an input of an Rx CAWG on another OPPM within the same switch array. Of course, in reality signals would not be send from the Tx of one OPPM to the Rx of the same OPPM, except for example in testing situations. However, the description here continues with reference to FIG. 3B for convenience. In preferred embodiments of all aspects of the present invention, the OPPMs making up the array are all identical or substantially identical, so this is a reasonable approach to take.

Due to the reversible nature of passive optical routers such as CAWGs, upon arrival at the selected input of the Rx CAWG, the optical signal is split into its original Q signals, each of which is incident on one of the array of photodiodes P1 to PQ. There, they are converted back into a plurality of electronic signals corresponding to (though not necessarily identical to) the plurality of electronic signals generated by the modulators M1 to MQ. These signals are then fed into the receiving side packet processor PP-Rx, whereupon they are reassembled into the original frame. Then, further processing takes place to reconstruct the original packet from the frames which arrive at the packet processor PP-Rx. Both the PP-Rx and PP-Tx may include a memory for temporarily storing data while "waiting" for the remainder of the fragmented packets to arrive, which may take place either after each optical hop, or only at the final destination OPPM.

If the OPPM at which the frame arrives is only an intermediate OPPM, then the packet (or frame) is sent via the receiving side output Rx-OUT to another fabric portion on the same OPPM, and the process as set out above is repeated. Otherwise, if the destination OPPM is the final destination OPPM, the packet (or frame) is sent to the client portion of the OPPM, where it is converted back into an optical signal (e.g. using another modulator such as an EAM) and sent to the output device (which may, like the input device, also be a host or a server).

The control aspect of the above process will be described in detail later in the application.

RPFab2

Figure 4B:
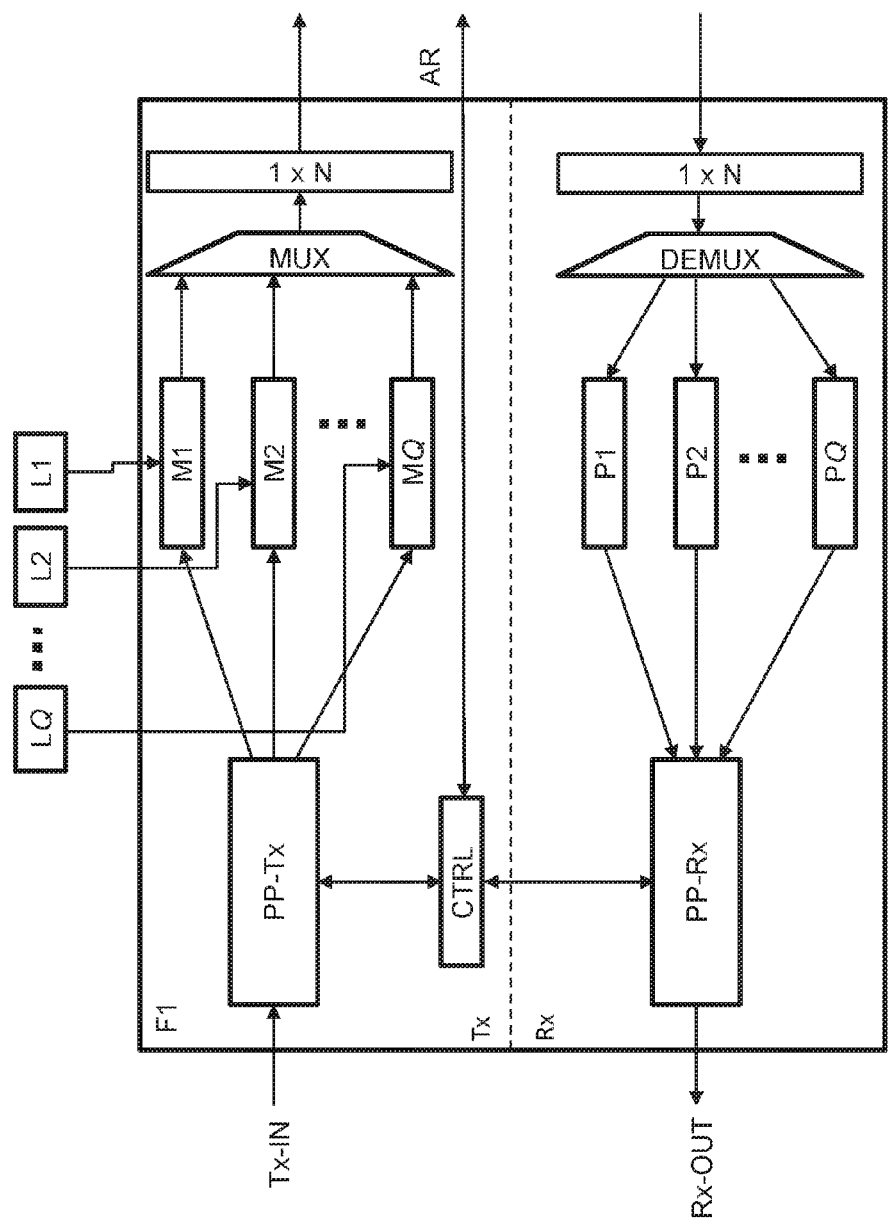
FIG. 4B shows a more detailed schematic diagram of a switch module as shown in FIG. 4A.

FIGS. 4A and 4B shows an alternative embodiment whereby the signal takes a different route from its source to its destination OPPM, though still in a hypercube-style network. In this embodiment, referred to herein as RPFab2, a full-mesh is not required between all of the OPPMs in a given row, or column as in FIG. 2 (or a sub-array in the N-dimensional case). In this embodiment, the effective full-mesh connectivity is provided by using active switches, rather than passive optical routers such as CAWGs. The active switches are able to control which output to send a signal to, depending, for example, on information contained within the signal.

As mentioned above, the active switch requires a control input signal to direct the input signals to the intended outputs. The exact form/requirement of this signal depends on the specific implementation of the active switch. An example of a suitable spatial switch is one based on Mach-Zehnder interferometers. Such a switch is described in U.S. Provisional Patent Application No. 62/234,454 which is incorporated herein by reference.

OPPMs used in the present embodiment are described in more detail below, with respect to FIG. 4B.

Fabric side F1 (also "first fabric portion") is divided into two parts, a transmission side (referred to herein as "Tx") and a receiving side (referred to herein as "Rx"). Tx includes a packet processor PP-Tx, which receives signals from a transmission side input Tx-IN, and an array of EAMs labelled M1, M2 etc, each of which receives an input from a corresponding light source labelled L1, L2 etc. An output of each of the EAMs forms an input to a multiplexer labelled MUX, whose single output is incident upon the input of a 1×N active switch (herein "the Tx active switch"). Rx also includes a corresponding N×1 active switch (herein "the Rx active switch"), each of its N inputs being optically connected to an output of a Tx active switch on each other OPPM in the sub-array. The output of the Rx active switch is incident on an input of a demultiplexer labelled DEMUX, whose Q outputs are each incident on one the Q photodetectors labelled P1, P2 etc. The outputs of the photodetectors P1, P2 etc. feed into an input of the receiving side packet processor PP-Rx, which itself feeds into the receiving side output Rx-OUT.

The switching process will now be described in detail with reference to FIG. 4B, which includes many features in common with FIG. 3B. In particular, the switching process up to the stage wherein the plurality of electronic signals are sent to the modulators M1 to MQ is the same. In this embodiment, however, there are no CAWGs or similar passive routers, in which the path of an optical signal is dependent on the wavelength and the input. As a result, there is no need to vary the wavelength of the light onto which the electronic signals are modulated. Accordingly, the light sources in the embodiment shown in FIG. 4B are fixed-wavelength light sources, and preferably fixed-wavelength lasers or fixed lasers. Each of the fixed lasers L1 to LQ has a different wavelength, and so the resulting plurality of optical signals exiting the modulators M1 to MQ do not interfere (or experience crosstalk) when they are multiplexed by the multiplexer (labelled MUX) into a single multiplexed signal. The multiplexed signal is then sent to the input of the Tx active switch. Based on the destination information stored on the original packet of data, and given that the frame of data which is sliced up and sent to the active switch is all intended for the same destination OPPM (in the next hop), the active switch then directs the optical signal from the one input to the output of the active switch (i.e. one of the N outputs), which is optically connected to a corresponding Rx active switch on the destination OPPM. As discussed earlier in the application this active switch may be e.g. a MZI cascade switch or an electronic crossbar switch, among others. The Rx active switch which receives the optical signal then directs it to its output, and then the (still multiplexed) signal is sent to the input of the demultiplexer DEMUX whereupon it is demultiplexed into signals corresponding to the plurality of optical signals output from the modulators M1 to MQ. Thereafter, the process is the same as in the previous embodiment, and is not repeated here.

Active Switches

Figure 10:
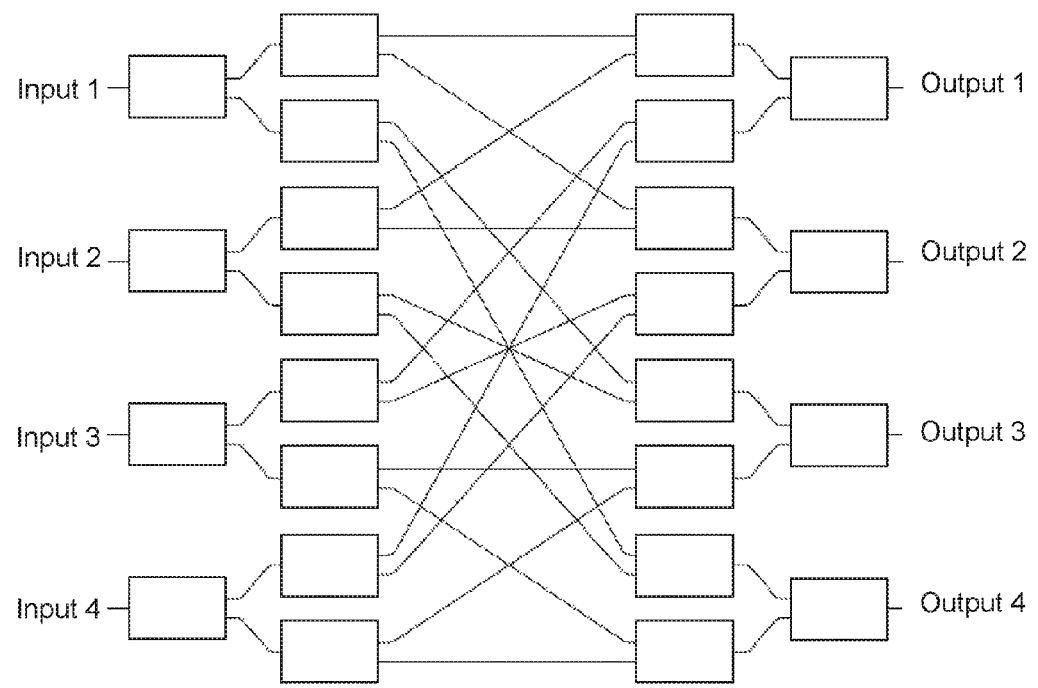
FIG. 10 shows an example of a layout of an MZI cascade switch which may be used in embodiments of the second and fourth aspects of the present invention.

In embodiments of the second and fourth aspects of the present invention, the active switch may be an optical active switch based on Mach-Zehnder interferometers. An example of a layout of such a switch is shown in FIG. 10. The solid rectangles denote individual MZIs. Using the notation adopted in the rest of this application, it can be seen that in this particular configuration, the MZI cascade switch has $R_i=4=2^2$ (i.e. n=2) inputs and outputs. The input side may be made up of four "1×4 "trees" (one of which is highlighted in the dashed box), each of which includes two stages of 1×2 MZIs. The output side has a mirror image arrangement. The inner two layers of 1×2 MZIs are connected so that a route may be provided from all inputs to all outputs simultaneously, if necessary, in a non-blocking fashion. In other words, each of the 4!=24 combinations of output which are possible between four inputs and four outputs are accommodated by the MZI cascade switch shown. The switch driver, as described briefly below is configured to control which of the 24 combinations is to be taken, but controlling the voltage applied across the electro-optic region of each 1×2 MZI.

Figure 11:
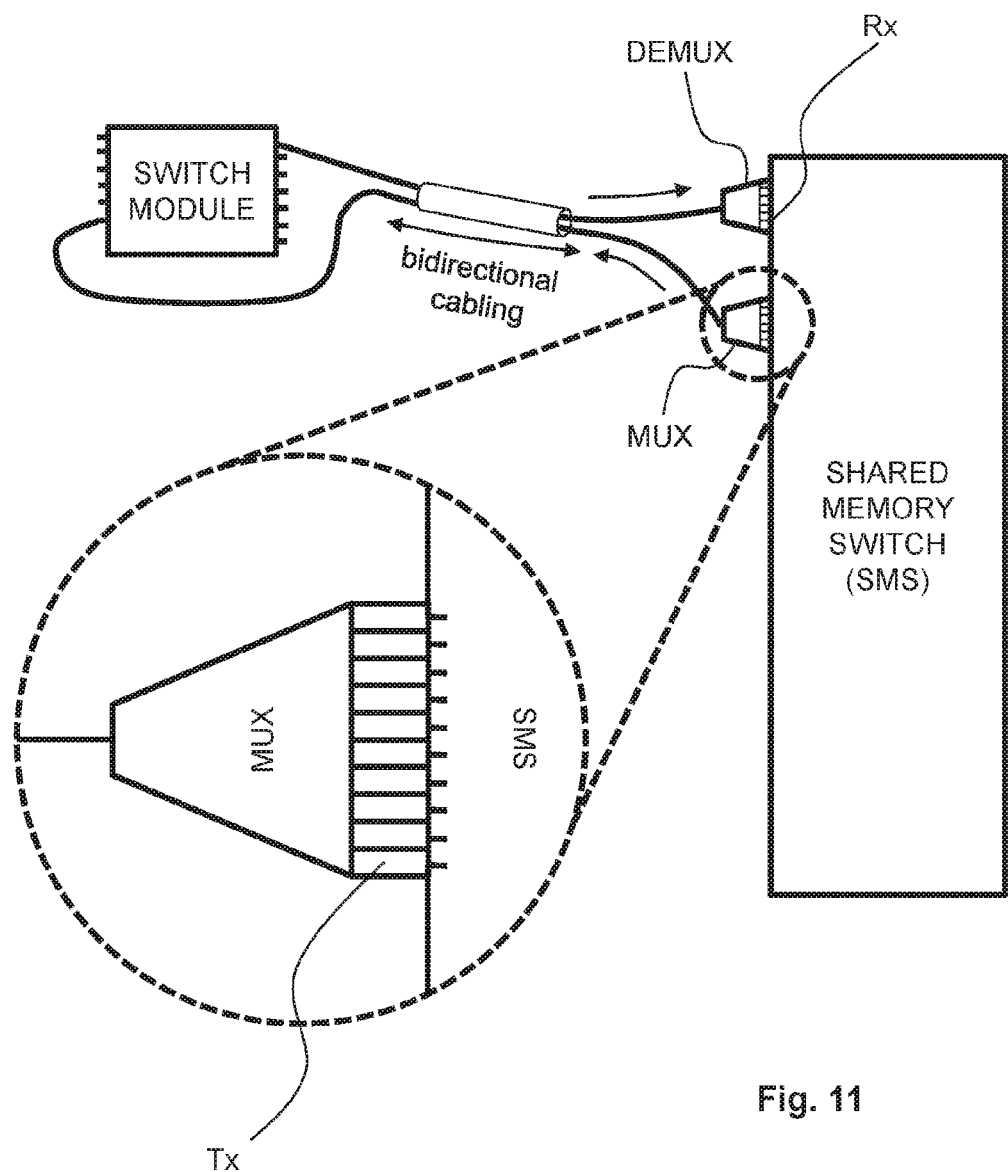
FIG. 11 shows an example of an embodiment of the second or fourth aspects of the present invention, employing an electronic shared-memory switch.

In alternative embodiments, which utilize electronic active switches, an arrangement as shown in FIG. 11. For simplicity only one switch module is shown. The bidirectional link shown conveys the multiplexed fabric output signals towards the (electronic) shared memory switch SMS. At the SMS, the signals are incident on a demultiplexer DEMUX, which is configured to split the multiplexed signals into a plurality of optical signals. The DEMUX has essentially the same structure as the MUX (shown in the enlarged view), only in reverse. The equivalents to the modules labelled "Rx" or "Tx" on the DEMUX act as optical to electronic (O/E) converters for converting the optical signals into a plurality of electronic signals which are then switched to the correct output by the SMS. Then, the modules "Rx" or "Tx" act as electronic to optical (E/O) converters to convert the switch electronic signals to optical signals which are then multiplexed to form another multiplexed signal which is conveyed to the correct destination OPPM via an optical link.

Star Architectures

Figure 5:
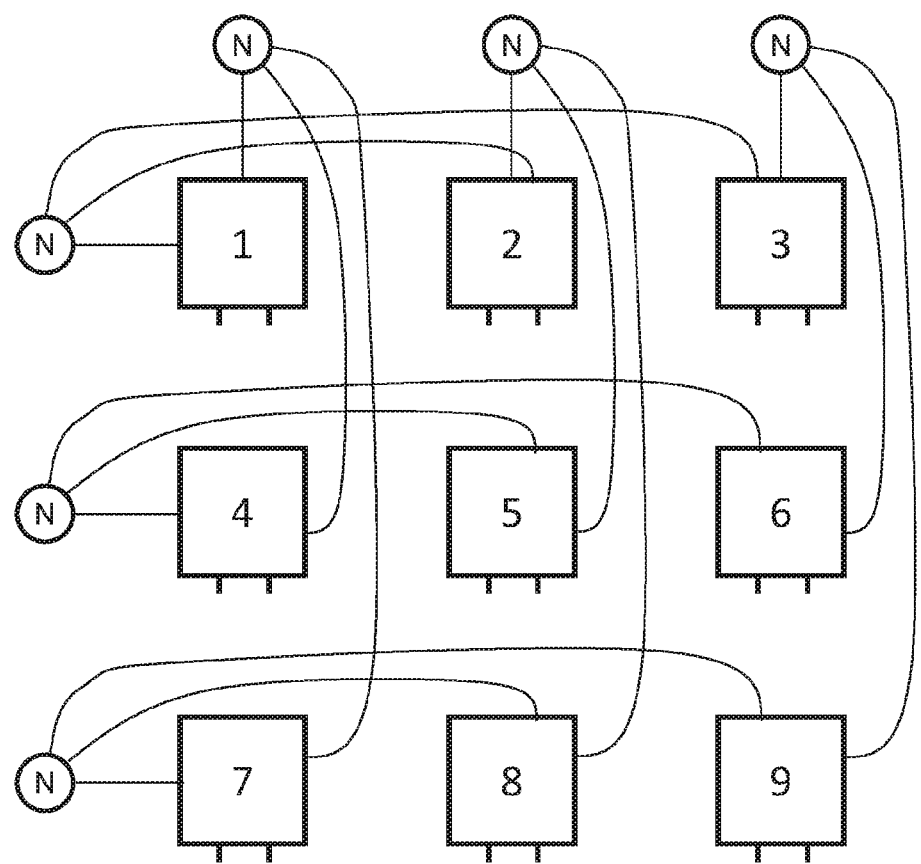
FIG. 5 shows a schematic network diagram illustrating the star-like topology as employed in embodiments of the third and fourth aspects of the present invention, in particular the nodes labelled N.

In alternative embodiments of the present invention, a different basic topology is used, which operate on the principles of star networks, rather than full-mesh interconnectivity. In a star network, each node N is connected to each other node via a single central node. In embodiments of the present invention, a modified version of this type of network is employed, as is shown schematically in FIG. 5. Like in FIG. 2, nine OPPMs are arranged in three rows and three columns. However, in embodiments which utilize the star topology, all data transmission, rather going directly from one OPPM to another in the same row/column (i.e. sub-array), is via a separate node, shown in FIG. 5 by the small circle labelled N at the end of each row and column. Thus it can be seen that transmission of a signal from one OPPM to another OPPM anywhere in an e.g. 2-dimensional network of OPPMs may take place in two hops, each hop being via the node. The "contents" of the node vary in the two embodiments described in detail below.

RPFab1

In the embodiment shown in FIG. 6A, like the embodiment shown in FIG. 3A, switching is carried out using CAWGs. However, in this embodiment, rather than each OPPM in a given sub-array including a CAWG connected on an input side and an output side, there are a band of CAWGs. There is no wavelength-division multiplexing in this embodiment, and so the number of parallel CAWGs in the band of CAWGs is equal to the number of modulators on the fabric portion on each switch module in a given array. Then, accordingly, each CAWG has as many inputs and outputs as there are OPPMs in the sub-array.

Each CAWG receives an input from one modulator on each OPPM, and similarly each modulator on a given OPPM is connected to an input of each CAWG. Unlike in the embodiment shown in FIG. 3A, in this embodiment the signals from the CAWGs input directly into the photodetectors P on the destination OPPM, rather than being demultiplexed by an additional CAWG. This is made possible by having a band of CAWGs to which all of the OPPMs in the sub-array have "access".

Figure 6B:
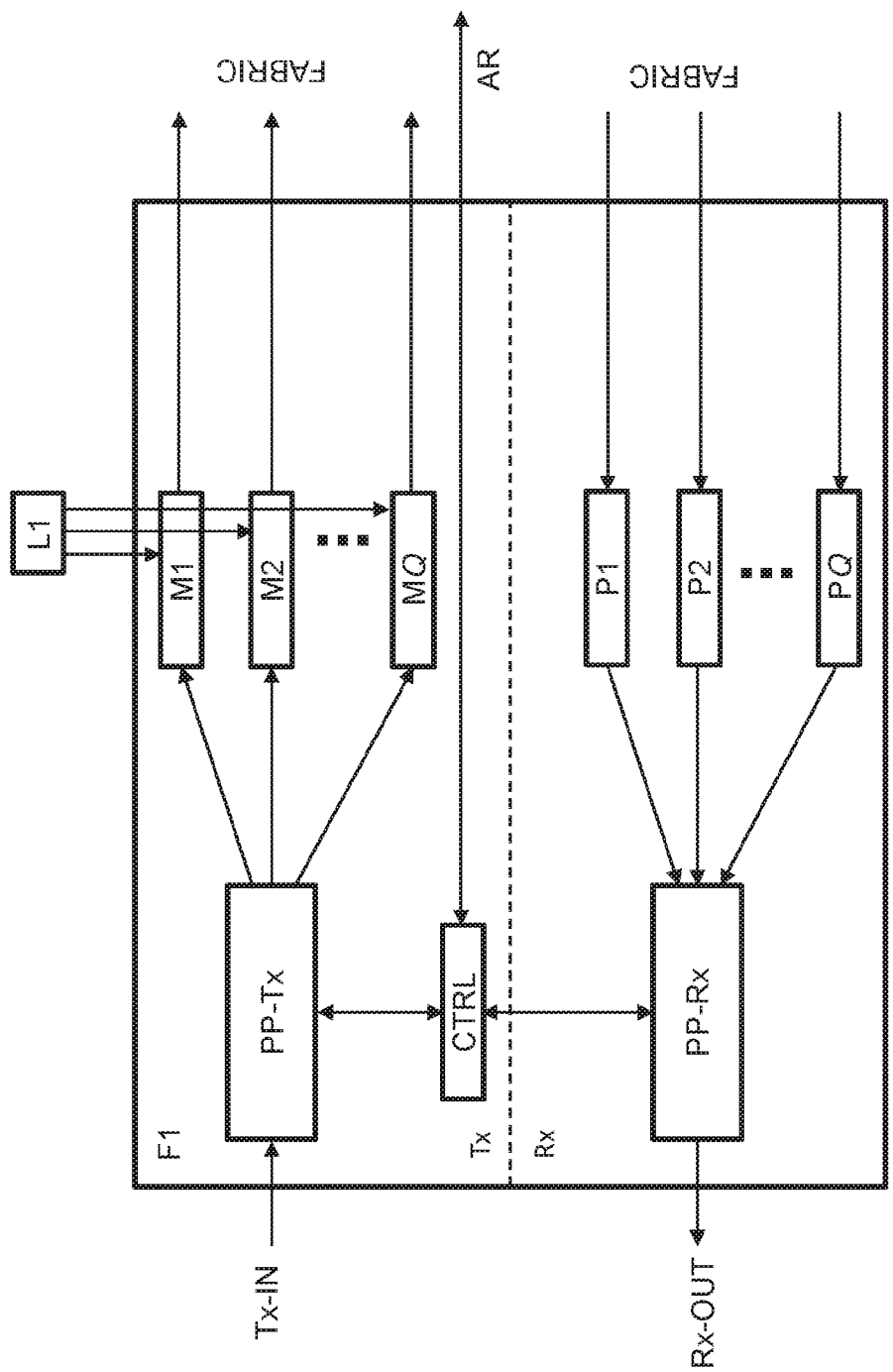
FIG. 6B shows a more detailed schematic diagram of a switch module as shown in FIG. 6A.

This embodiment will now be described in more detail with reference to FIGS. 6A and 6B. Fabric side F1 (also "first fabric portion") is divided into two parts, a transmission side (referred to herein as "Tx") and a receiving side (referred to herein as "Rx"). Tx includes a packet processor PP-Tx, which receives signals from a transmission side input Tx-IN, and an array of EAMs labelled M1, M2 etc, each of which receives an input from a single light source labelled L1 etc. The outputs of the EAMs act as inputs to CAWGs, however, unlike in FIG. 3A (showing RPFab0), the CAWGs do not form part of the OPPMs themselves.

Rather, in this embodiment the CAWGs are part of a band (i.e. a set or plurality) of CAWGs accessible to all OPPMs in a given sub-array. For example, a band of CAWGs forms each node N shown in FIG. 5. Specifically, the output of each of the Q modulators M1 to MQ connects to an input of each CAWG in the set of CAWGs. Correspondingly, an output of each CAWG in the set of CAWGs is incident on each photodetector P1 to PQ on the receiving side Rx of the fabric portion F1. The outputs of the photodetectors P1, P2 etc. feed into an input of the receiving side packet processor PP-Rx, which itself feeds into the receiving side output Rx-OUT.

The switching process will now be described in detail with reference to FIG. 6B, which includes many features in common with FIGS. 3B and 4B. In particular, the switching process up to the stage wherein the plurality of electronic signals are sent to the modulators M1 to MQ is the same. Each of the modulators M1 to MQ receives an input from just one variable-wavelength light source (i.e. one light source services all modulators), which is preferably a tunable laser, here labelled L1. As discussed above, the outputs of the modulators M1 to MQ are incident upon respective inputs of each of CAWGs which are associated with the sub-array in which the OPPM is included. Like in RPFab0, the CAWGs are arranged so that the selection of a single wavelength for all of the modulated signals causes the CAWGs to route the signals to each of the array of photodetectors on the Rx side of the destination OPPM. Thereafter, the process is the same as that in previous embodiments. The bandwidth in this embodiment is improved due to the increased parallelism, i.e. by breaking a signal up and sending it over different channels, rather than all in one.

RPFab3

Figure 7A:
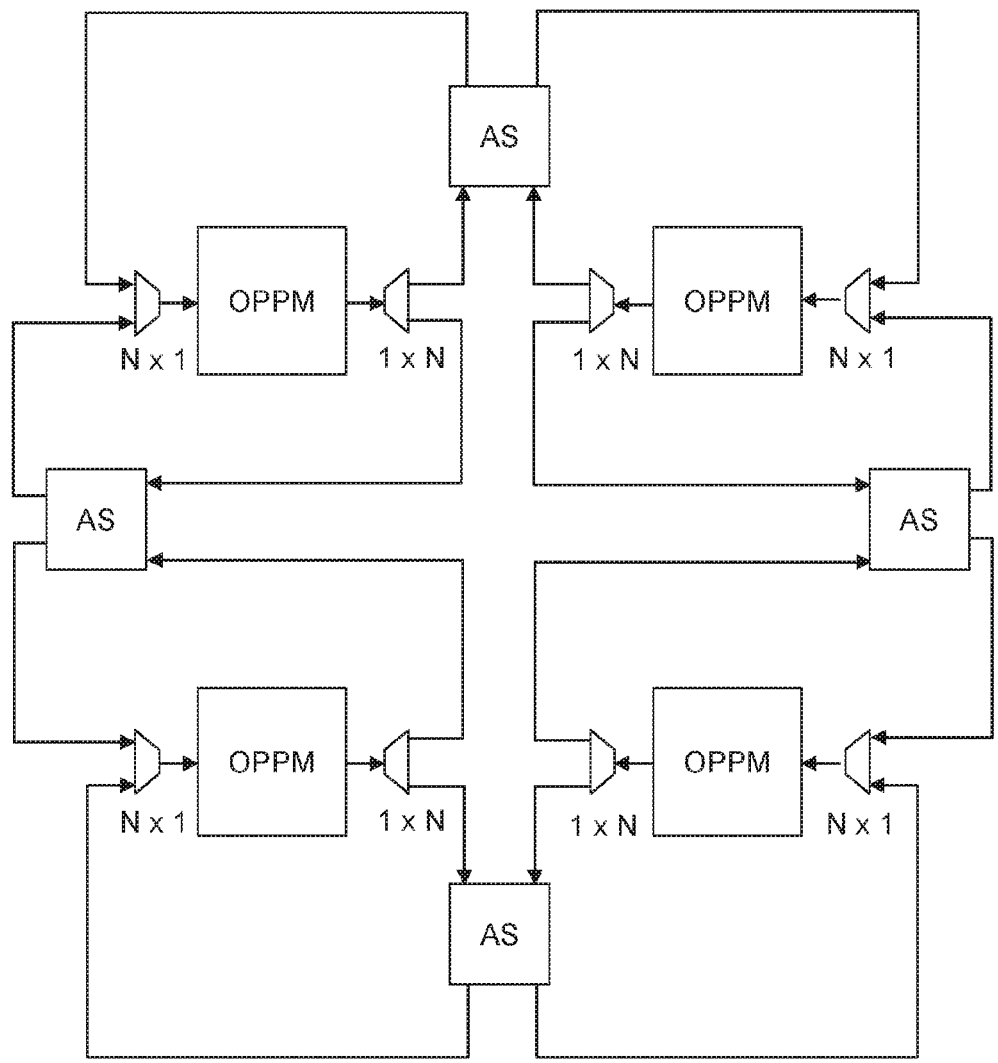
FIG. 7A shows the path of data when being switched between four switch modules in four different sub-arrays, according to embodiments of the fourth aspect of the present invention.
Figure 7B:
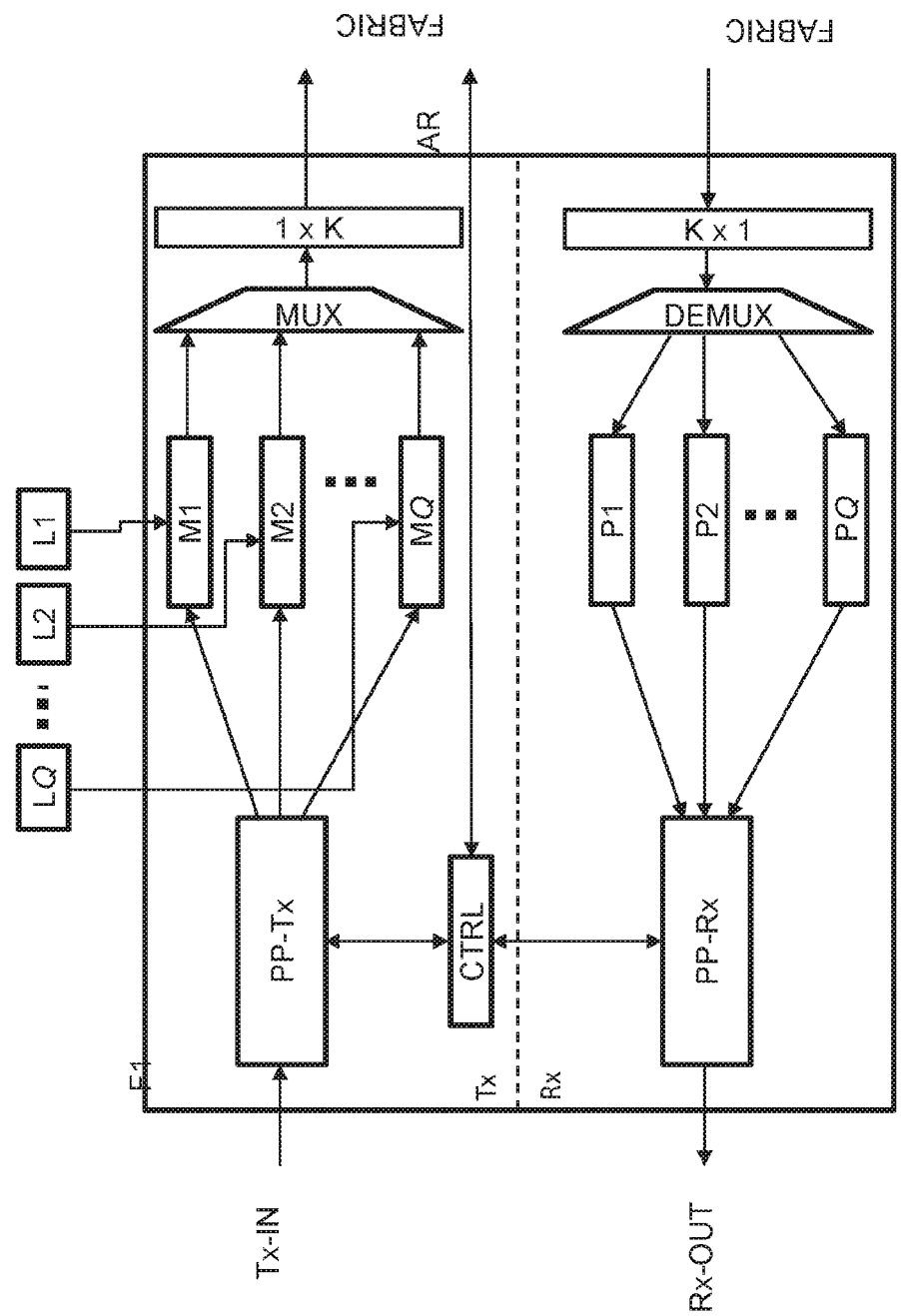
FIG. 7B shows a more detailed schematic diagram of a switch module or OPPM as shown in FIG. 7A.

FIGS. 7A and 7B shows an alternative embodiment which is based upon a star topology. Embodiments of an optoelectronic switch according to FIGS. 7A and 7B still have the underlying pattern whereby each sub-array has an associated node which facilitates a connection between all of the OPPMs in that sub-array. In this embodiment, however, rather than a band of CAWGs, the node includes a band of $R_i \times R_i$ active switches, of the same or a similar kind as shown in the embodiment of FIG. 4A.

FIG. 7A shows the connections employed in a 2×2 arrangement of OPPMs according to the fourth aspect of the present invention. Here, each of the rows and each of the columns of OPPMs represent sub-arrays, with each sub-array containing an active switch AS. In FIG. 7A, the fabric active switch AS "associated with a given sub-array" is the fabric active switch which is located in between the two OPPMs forming that sub-array. Accordingly, each OPPM is a member of two sub-arrays and is connected to two fabric active switches AS. Depending on the intended destination of a given packet or frame of data, in the next hop, it may be necessary to send the frame or packet in the vertical dimension or the horizontal dimension. So, in order to provide this option, the 1×N active switches are able to direct signals to the fabric active switch AS in either of the two sub-arrays of which a given OPPM is a member.

Fabric side F1 (also "first fabric portion") is divided into two parts, a transmission side (referred to herein as "Tx") and a receiving side (referred to herein as "Rx"). Tx includes a packet processor PP-Tx, which receives signals from a transmission side input Tx-IN, and an array of EAMs labelled M1, M2 etc, each of which receives an input from a corresponding light source labelled L1, L2 etc. An output of each of the EAMs forms an input to a multiplexer labelled MUX, whose single output is incident upon the input of a 1×N active switch (herein "the Tx active switch"). In place of the band of CAWGs which form the nodes in RPFab1, there is a fabric active switches in each sub-array having $R_i$ inputs and $R_i$ outputs. Each Tx active switch has an output optically connected to an input of the fabric active switch. Correspondingly, each of the $R_i$ outputs of the fabric active switch in a given sub-array is optically connected to a respective Rx active switch (having N inputs and one output, one of each of the N inputs arranged to receive a signal from an active switch associated with each of the sub-arrays of which that OPPM is a member). The output of the Rx active switches is connected to an input of a demultiplexer labelled DEMUX, whose Q outputs are each incident on one the Q photodetectors labelled P1, P2 etc. The outputs of the photodetectors P1, P2 etc. feed into an input of the receiving side packet processor PP-Rx, which itself feeds into the receiving side output Rx-OUT, as in the previous three embodiments described in detail.

The switching process will now be described in detail with reference to FIG. 7B, which includes many features in common with FIGS. 3B, 4B and 6B. In particular, the switching process up to the stage wherein the plurality of electronic signals are sent to the modulators M1 to MQ is the same. In this embodiment, however, there are no CAWGs or similar passive routers, in which the path of an optical signal is dependent on the wavelength and the input. As a result, there is no need to vary the wavelength of the light onto which the electronic signals are modulated. Accordingly, the light sources in the embodiment shown in FIG. 7B are fixed-wavelength light sources, and preferably fixed-wavelength lasers or fixed lasers. Each of the fixed lasers L1 to LQ has a different wavelength, and so the resulting plurality of optical signals exiting the modulators M1 to MQ do not interfere (or experience crosstalk) when they are multiplexed by the multiplexer (labelled MUX) into a single multiplexed signal. The multiplexed signal is then sent to the input of the Tx active switch having N outputs. Then, based on the destination information from the original packet, the Tx active switch directs the (now multiplexed) signal to one of the N outputs corresponding to one of the fabric active switches (i.e. depending on the dimension along which the signal must be switched, determined e.g. by the transmission side packet processor PP-Tx), from which it is sent to the fabric active switch of choice. Then, again based on the destination information, the signal is directed from the input of the fabric active switch at which it arrived to one of the $R_i$ outputs corresponding to the destination (i.e. next hop) OPPM, from which it is sent to one of the N inputs of that Rx active switch. The Rx active switch which receives the optical signal then directs it to its output, and then the (still multiplexed) signal is sent to the input of the demultiplexer DEMUX whereupon it is demultiplexed into signals corresponding to the plurality of optical signals output from the modulators M1 to MQ. Thereafter, the process is the same as in the previous embodiment, and is not repeated here.

Arbitration

In order to operate effectively, switches as shown in e.g. FIGS. 3B, 4B, 6B and 7B are controlled by an arbiter. Broadly speaking, the main function of the arbiters is to ensure that there is a one-to-one matching between transmitting and receiving switch modules which are connected along the same sub-array (i.e. solving a bipartite graph matching problem). As can be seen in FIGS. 3B, 4B, 6B and 7B, OPPMs or switch modules according to some embodiments of the present invention include controllers (labelled CTRL) which are connected to the Tx and Rx packet processors, and are configured to receive inputs from these packet processors, relating to the intended destination of the packets incident upon them. This information is then relayed to the arbiter which calculates the optimal scheme of operation for either the active switches (in those embodiments including active switches) and/or the switch modules themselves, in a manner which ensures that all of the signals reach their destination OPPM, i.e. to provide data transfer routes such that each transmission side of a fabric portion is paired with the correct receiving side of a fabric portion, in order to effect non-blocking operation. Once this scheme of operation is calculated, in the case of embodiments including active switches, the scheme is transmitted to a switch driver which directly drives and controls the operation of the active switches.

Figure 8A:
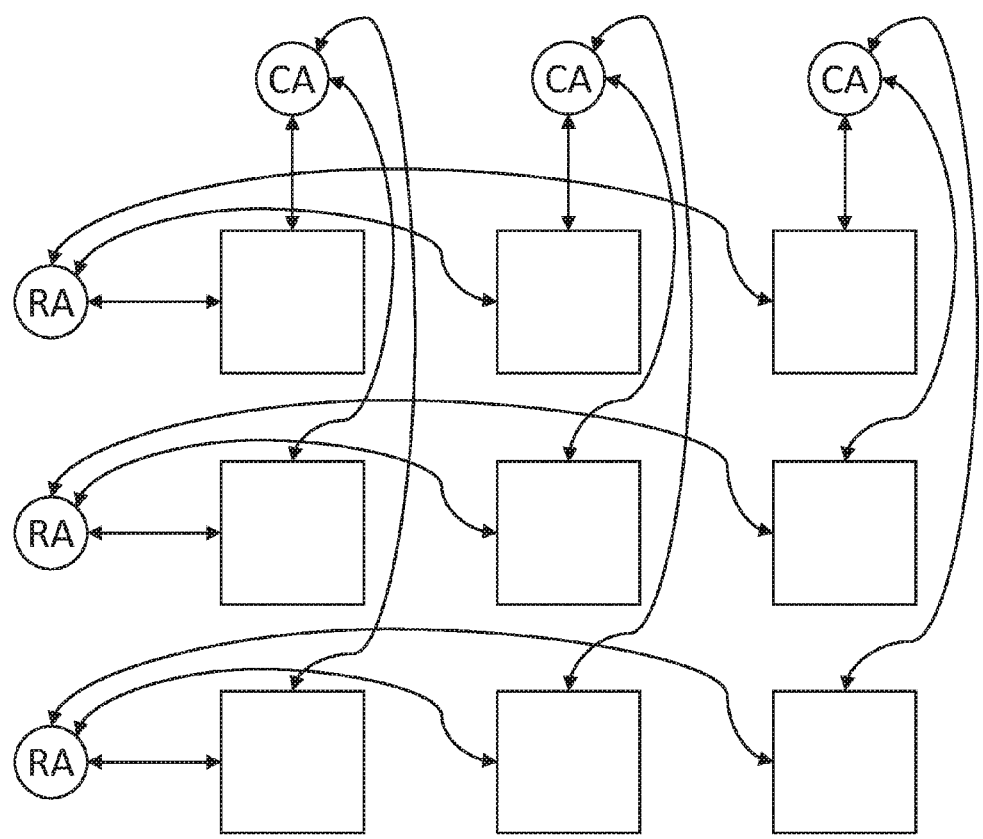
FIGS. 8A and 8B shows how arbiters may be connected within the array of switch modules according to embodiments of the present invention.

FIG. 8A shows an example of how the arbiters may be connected to the OPPMs in a 3×3 array of OPPMs. Here, an arbiter is associated with every sub-array of OPPMs. In this 2D example, each row is associated with a row arbiter RA, and each column is associated with a column arbiter CA. Thus, data transfer between OPPMs which are located in the same row may be controlled by the relevant row arbiter RA and subsequent optical hops between rows, may be controlled by the relevant column arbiter CA. In embodiments including electronic active switches, rather than optical active switches, the arbiter functionality may be provided within the electronic active switches themselves, rather than requiring separate components. FIG. 8A shows a similar arrangement to FIG. 8B, but with the arbiter connections (also known as the "control plane") shown in dotted lines, and the data connections (also known as the "data plane") shown in solid lines. The embodiment in FIG. 8B, is an example of an embodiment of the first or second aspect of the present invention, wherein the OPPMs within a given sub-array are not connected via e.g. a band of CAWGs or active switches.

Figure 8B:
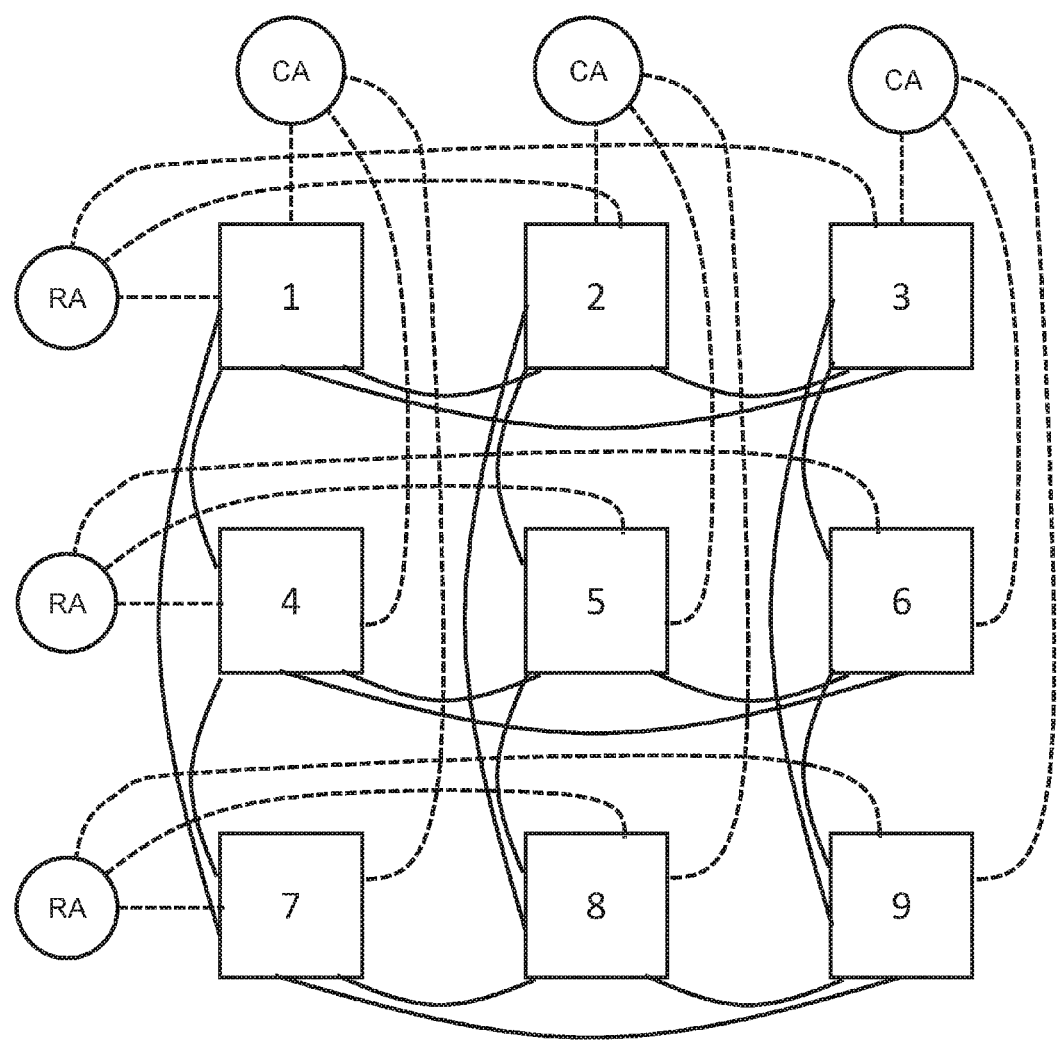
Figure 9:
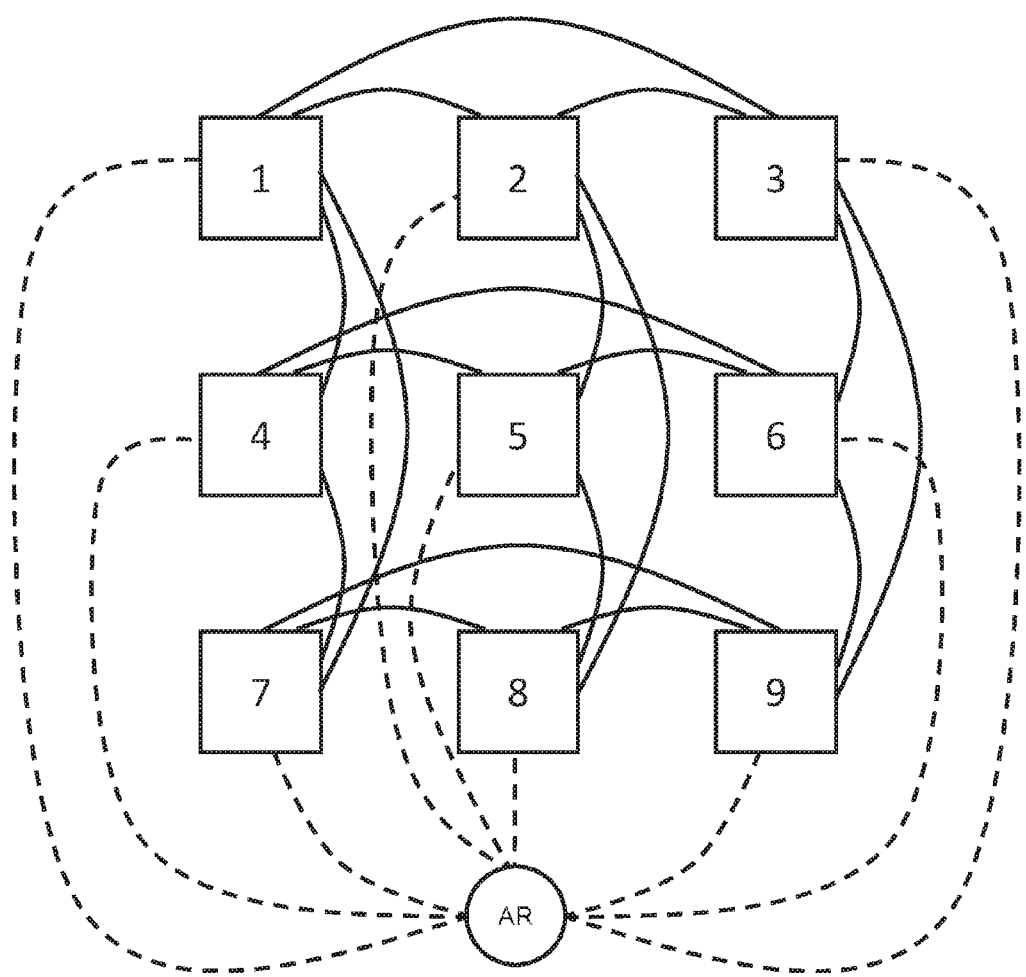
FIG. 9 shows an alternative example of how arbiters may be connected within the array of switch modules according to embodiments of the present invention.

FIG. 9 shows an alternative embodiment (with the different types of lines having the same meaning as in FIG. 8B), in which rather than an arbiter AR being associated with each sub-array, there is a single arbiter which is connected to every OPPM in the whole array.

These controllers are connected to arbiters which are used to control the timing of the various switching bursts which are occurring in the optoelectronic switch at any one time. The complexity of the arbitration process depends on, amongst other things, the size of the array of the OPPMs and the way in which the arbiters are connected to the OPPMs. FIGS. 8 and 9 show two schemes of connection between the arbiters and the OPPMs, more specifically the controllers on those OPPMs as shown in FIGS. 3B, 4B, 6B and 7B. In these drawings, the dotted lines represent the connections of the arbiter(s) (also known as the control plane), and the solid lines represent the connections between the OPPMs over which data is transferred (also known as the data plane).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention may also include further optional features as set out in the numbered paragraphs below:

A1. An optoelectronic switch for switching an optical signal from an input cable to an output cable, the switch including a plurality of optical packet processing modules (OPPMs) and an interconnecting fabric, wherein each OPPM includes:
- a client input;
- a client output;
- a fabric input;
- a fabric output;
- conversion means for converting the wavelength of a signal received at the fabric input or the client input, and outputting a converted output signal to the fabric output;
- routing means connected between the conversion means and the interconnecting fabric, the routing means configured to direct the output signal to a destination OPPM, and
- wherein a fabric output of each OPPM is connected to a fabric input of each other OPPM via the routing means and the interconnecting fabric, which is in the form of a full-mesh.

A2. A 2-dimensional optoelectronic switch for switching an optical signal from an input cable to an output cable, the switch including a plurality of OPPMs arranged in L rows and M columns, and an interconnecting fabric, each OPPM having:
- a client input;
- a client output;
- a fabric input;
- a fabric output;
- conversion means for converting the wavelength of a signal received at the fabric input or the client input, and outputting a converted output signal to the fabric output;
- routing means connected between the conversion means and the interconnecting fabric, the routing means configured to direct the output signal to a destination OPPM,
wherein:
- a fabric output from each OPPM is connected via the routing means and the interconnecting fabric to a fabric input of each of the other (L−1) OPPMs in the same column,
- a fabric output from each OPPM is connected via the routing means and the interconnecting fabric to a fabric input of each of the other (M−1) OPPMs in the same row, and
- each OPPM is capable of acting as an intermediate OPPM, wherein signals are forwarded from the fabric input to the fabric output on the same OPPM.

A3. An N-dimensional optoelectronic switch for switching an optical signal from an input cable to an output cable, the switch including a plurality of OPPMs arranged in an N-dimensional array, wherein there are $n_i$ switches in the $i^{th}$ dimension (where i=1, 2, . . . , N−1, N), and an interconnecting fabric, each OPPM having:
- a client input;
- a client output;
- a fabric input;
- a fabric output;
- conversion means for converting the wavelength of a signal received at the fabric input or the client input, and outputting a converted output signal to the fabric output;
- routing means connected between the fabric output and the interconnecting fabric, the routing means configured to direct the converted output signal to a destination OPPM,
wherein:
- for each value of i, a fabric output of each OPPM is connected via the routing means and the interconnecting fabric to a fabric input of each of the other $(n_i-1)$ OPPMs which have the same coordinate in all of the other (N−1) dimensions except for that value of i, to form a generalized hypercube network, and
- each OPPM is capable of acting as an intermediate OPPM, wherein signals are forwarded from the fabric input to the fabric output on the same OPPM.

A4. An optoelectronic switch according to any of A1 to A3, wherein the routing means directs the converted output signal to its destination OPPM based on the wavelength of the converted optical signal.

A5. An optoelectronic switch according to any of A1 to A3, wherein the routing means is a cyclic AWG connected between the fabric output of the OPPM and the interconnecting fabric.

A6. An optoelectronic switch according to A4, wherein each OPPM has a second cyclic AWG connected between the interconnecting fabric and the fabric input.

A7. An optoelectronic switch according to any of A1 to A6, wherein the conversion means includes a photodetector for receiving incoming optical signals from the fabric input or client input and converting them into corresponding electronic signals, a tunable laser for providing a carrier signal of a desired wavelength, and a modulator for modulating the carrier signal to contain the information in said electronic signals, to generate the converted output signal.

A8. An optoelectronic switch according to A7, wherein the conversion means includes a plurality of photodetectors, a plurality of modulators and a plurality of tunable lasers, wherein each tunable laser provides a carrier signal to an associated modulator.

A9. An optoelectronic switch according to A7 or A8, wherein the conversion means also includes control electronics for determining the wavelength of the converted output signal.

A10. An optoelectronic switch according to A9, wherein the determination of the wavelength of the converted output signal is based on a destination OPPM of the incoming optical signal.

A11. An optoelectronic switch according to any one of A1 to A10, further including an arbiter which is connected to all of the OPPMs, for allocating a destination OPPM to all optical input signals received at the fabric input or client input, in order to maximize the number of optical input signals which can be simultaneously transmitted from a client input or fabric input on one OPPM to a client output or fabric output on the same or another OPPM.

B1. A 2-dimensional optoelectronic switch for switching an optical signal from an input cable to an output cable, the switch including a plurality of OPPMs arranged in L rows and M columns, each OPPM having:
- a client input;
- a client output;
- a fabric input;
- a fabric output;
- conversion means for converting the wavelength of a signal received at the fabric input or the client input, and outputting a converted output signal to the fabric output;

wherein:
each row and each column of OPPMs also includes a routing means configured to direct the output signal to a destination OPPM, the routing means connected to a fabric output of each OPPM of that row or column,
a fabric output from each OPPM is connected via the routing means to a fabric input of each of the other (L−1) OPPMs in the same column, and
a fabric output from each OPPM is connected via the routing means to a fabric input of each of the other (M−1) OPPMs in the same row
each OPPM is capable of acting as an intermediate OPPM, wherein signals are forwarded from the fabric input to the fabric output on the same OPPM.

B2. An N-dimensional optoelectronic switch for switching an optical signal from an input cable to an output cable, the switch including a plurality of OPPMs arranged in an N-dimensional array, wherein there are $n_i$ switches in the $i^{th}$ dimension (where i=1, 2, . . . , N−1, N), each OPPM having:
a client input;
a client output;
a fabric input;
a fabric output;
conversion means for converting the wavelength of a signal received at the fabric input or the client input, and outputting a converted output signal to the fabric output;
wherein:
each OPPM is a member of N sub-arrays, wherein a sub-array is defined as the set of OPPMs having the same coordinate in all dimensions except one, and wherein each sub-array is associated with a routing means configured to direct the converted output signal to a destination OPPM, said routing means connected to a fabric output of each OPPM in that sub-array;
for each value of i, a fabric output of each OPPM is connected via the routing means to a fabric input of each of the other ($n_i$−1) OPPMs which have the same coordinate in all of the other (N−1) dimensions except for that value of i, to form a generalized hypercube network, and
each OPPM is capable of acting as an intermediate OPPM, wherein signals are forwarded from the fabric input to the fabric output on the same OPPM.

B3. An optoelectronic switch according to B1 or B2, wherein the routing means directs the converted output signal to its destination OPPM, either directly or via an intermediate OPPM, based on the wavelength of the converted optical signal.

B4. An optoelectronic switch according to any one of B1 to B3, wherein the routing means is a cyclic AWG.

B5. An optoelectronic switch according to any one of B1, B3 and B4, wherein the conversion means includes two or more photodetectors for receiving incoming optical signals from the fabric input or client input and converting them into corresponding electronic signals, a tunable laser for providing a carrier signal of a desired wavelength, and two or more modulators for modulating the carrier signal to contain the information in said electronic signals, to generate the converted output signal.

B6. An optoelectronic switch according to B5, wherein each OPPM has a first modulator and a second modulator wherein a first modulator is configured to transmit its converted output signal to the routing means in the same row as the OPPM, and the second modulator is configured to transmit its converted output signal to the routing means in the same column as the OPPM.

B7. An optoelectronic switch according to any one of B2 to B4, wherein the conversion means includes N or more photodetectors for receiving incoming optical signals from the fabric input or client input and converting them into corresponding electronic signals, a tunable laser for providing a carrier signal of a desired wavelength, and N or more modulators for modulating the carrier signal to contain the information in said electronic signals, to generate the converted output signal.

B8. An optoelectronic switch according to B7, wherein each OPPM includes N modulators, each of the N modulators configured to transmit its converted output signal to a routing means associated with each sub-array of which that OPPM is a member.

B9. An optoelectronic switch according to any one of B5 to B8, wherein the conversion means of each OPPM includes a single tunable laser configured to provide a carrier signal to all of the two or more modulators.

B10. An optoelectronic switch according to any one of B5 to B9, wherein the conversion means also includes control electronics for determining the wavelength of the converted output signal.

B11. An optoelectronic switch according to B10, wherein the determination of the wavelength of the converted output signal is based on a destination OPPM of the incoming optical signal.

B12. An optoelectronic switch according to any one of B1 to B12, further including an arbiter which is connected to all of the OPPMs, for allocating a destination OPPM to all optical input signals received at the fabric input or client input, in order to maximize the number of optical input signals which can be simultaneously transmitted from a client input or fabric input on one OPPM to a client output or fabric output on the same or another OPPM.

C1. An optoelectronic switch for switching an optical signal from an input cable to an output cable, the switch including a plurality of switch modules, each switch module having:
an OPPM including:
a client input;
a client output;
a fabric input;
a fabric output; and
conversion means for converting the wavelength of a signal received at the fabric input or the client input, and outputting a converted output signal to the fabric output;
a multiplexer connected to the fabric output, and having a multiplexer output which is connected to a first spatial switch having one input and S outputs,
a demultiplexer connected to the fabric input, and having a demultiplexer input which is connected to a second spatial switch having S inputs and one output
wherein each switch module is connected to every other switch module via connections between the outputs of the first spatial switches and inputs of the second spatial switches, which connections form a full mesh.

C2. An optoelectronic switch according to C1, wherein the conversion means includes a photodetector for receiving incoming optical signals from the fabric input or client input and converting them into corresponding electronic signals, a laser for providing a carrier signal of a desired wavelength, and a modulator for modulating the carrier signal to contain the information in said electronic signals, to generate the converted output signal.

C3. An optoelectronic switch according to C2, wherein the laser is a fixed laser.

C4. An optoelectronic switch according to C2 or C3, wherein the conversion means also includes control electronics for determining the wavelength of the converted output signal.

C5. An optoelectronic switch according to any of C1 to C4, wherein the determination of the wavelength of the converted output signal is based on a destination OPPM of the incoming optical signal.

C6. An optoelectronic switch according to any of C1 to C5, wherein the demultiplexer and/or multiplexer of each OPPM is an AWG.

C7. An optoelectronic switch according to any of C1 to C6, further including an arbiter which is connected to all of the OPPMs, for allocating a destination OPPM to all optical input signals received at the fabric input or client input, in order to maximize the number of optical input signals which can be simultaneously transmitted from a client input or fabric input on one OPPM to a client output or fabric output on the same or another OPPM.

D1. An optoelectronic switch for switching an optical signal from an input cable to an output cable, the switch including a plurality S of switch modules, each switch module having:
  an OPPM including:
    a client input;
    a client output;
    a fabric input;
    a fabric output; and
    conversion means for converting the wavelength of a signal received at the fabric input or the client input, and outputting a converted output signal to the fabric output;
  a multiplexer connected to the fabric output, and having a multiplexer output which is connected to a 1×K spatial switch having one input and K outputs, each of the K outputs connected to an S×S spatial switch having S inputs and S outputs, wherein the number of S×S switches is K,
  a demultiplexer connected to the fabric input, and having a demultiplexer input which is connected to a K×1 spatial switch having K inputs and one output, each of the K inputs configured to receive a signal from one of the S outputs of one of the S×S spatial switches
  wherein each switch module is connected to every other switch module via connections between the outputs of the first spatial switches and inputs of the second spatial switches, which connections form a full mesh.

D2. An optoelectronic switch according to D1, wherein K is no less than 2 and no greater than 10.

D3. An optoelectronic switch according to D1 or D2, wherein the conversion means includes a photodetector for receiving incoming optical signals from the fabric input or client input and converting them into corresponding electronic signals, a laser for providing a carrier signal of a desired wavelength, and a modulator for modulating the carrier signal to contain the information in said electronic signals, to generate the converted output signal.

D4. An optoelectronic switch according to D3, wherein the laser is a fixed laser.

D5. An optoelectronic switch according to D3 or D4, wherein the conversion means also includes control electronics for determining the wavelength of the converted output signal.

D6. An optoelectronic switch according to any of D1 to D5, wherein the determination of the wavelength of the converted output signal is based on a destination OPPM of the incoming optical signal.

D7. An optoelectronic switch according to any of D1 to D6, wherein the demultiplexer and/or multiplexer of each OPPM is an AWG.

D8. An optoelectronic switch according to any of D1 to D7, further including an arbiter which is connected to all of the OPPMs, for allocating a destination OPPM to all optical input signals received at the fabric input or client input, in order to maximize the number of optical input signals which can be simultaneously transmitted from a client input or fabric input on one OPPM to a client output or fabric output on the same or another OPPM.

E1. An optical packet processing module (OPPM), suitable for use in an optoelectronic switch for switching an optical signal from an input cable to an output cable, the OPPM including:
  a client input;
  a client output;
  a fabric input;
  a fabric output;
  conversion means for converting the wavelength of a signal received at the fabric input or the client input, and outputting a converted output signal to the fabric output;
  routing means connected between the conversion means and an interconnecting fabric, the routing means configured to direct the output signal to a destination OPPM, and
  wherein the OPPM is capable of acting as an intermediate OPPM, wherein signals are forwarded from the fabric input to the fabric output.

E2. A switch module for use in an optoelectronic switch for switching an optical signal from an input cable to an output cable, the switch module including:
  an OPPM having:
    a client input;
    a client output;
    a fabric input;
    a fabric output; and
    conversion means for converting the wavelength of a signal received at the fabric input or the client input, and outputting a converted output signal to the fabric output;
  a multiplexer connected to the fabric output, and having a multiplexer output,
  a demultiplexer connected to the fabric input, and having a demultiplexer input configured to receive an external multiplexed signal,
  wherein the OPPM is capable of acting as an intermediate OPPM, wherein signals are forwarded from the fabric input to the fabric output.

The invention claimed is:

1. An optoelectronic switch for transferring an optical signal from an input device to an output device, the optoelectronic switch including an array of interconnected switch modules, which are interconnected by an interconnecting fabric, wherein:
  the switch modules are arranged in an N-dimensional array, the $i^{th}$ dimension having a size $R_i$ ($i=1, 2, \ldots, N$), each switch module having an associated set of coordinates giving its location with respect to each of the N dimensions;
  each switch module is a member of N sub-arrays $S_i$, each sub-array $S_i$ comprising $R_i$ switch modules whose coordinates differ only in respect of their location in the i$^{th}$ dimension, and each of the N sub-arrays being associated with a different dimension, and each switch module has:
- a client portion for connecting to an input device and/or an output device;
- a first fabric portion and a second fabric portion, configured to process signals and communicate with other switch modules, each of the first fabric portion and the second fabric portion having a transmission side and a receiving side,
- wherein the transmission side of the first fabric portion includes:
  - a transmission side input for receiving a first electronic signal carrying destination information about a destination switch module for the first electronic signal, the first electronic signal received from either:
    - a receiving side output of the second fabric portion or
    - an input device, via the client portion;
  - a modulator for converting said first electronic signal into a first plurality of optical signals containing the same information, the wavelength of each of the first plurality of optical signals selected based on the destination information;
  - a transmission side passive router having inputs and outputs, the path of an optical signal from a given input dependent on the wavelength of that optical signal,
- wherein the receiving side of the first fabric portion includes:
  - a receiving side passive router having inputs and outputs, wherein
    - the path of an optical signal through the receiving side passive router depends on the wavelength of that optical signal, and
    - an input of each receiving side passive router is optically connected to an output of a first passive router on each other switch module in the same sub-array, and is configured to receive an optical signal from that output;
  - a photodetector for converting a second plurality of optical signals from the receiving side passive router into a corresponding second electronic signal; and
  - a receiving side output for sending the second electronic signal to either:
    - a transmission side input of the second fabric portion, or
    - an output device, via the client portion.

2. An optoelectronic switch for transferring an optical signal from an input device to an output device, the optoelectronic switch including an array of interconnected switch modules, which are interconnected by an interconnecting fabric, wherein:
  the switch modules are arranged in an N-dimensional array, the i$^{th}$ dimension having a size $R_i$ (i=1, 2, ..., N), each switch module having an associated set of coordinates giving its location with respect to each of the N dimensions;
  each switch module is a member of N sub-arrays $S_i$, each sub-array $S_i$ comprising $R_i$ switch modules whose coordinates differ only in respect of their location in the i$^{th}$ dimension, and each of the N sub-arrays being associated with a different dimension, and each switch module has:
- a client portion for connecting to an input device or an output device;
- a first fabric portion and a second fabric portion, each for processing signals and communicating with other switch modules, the first fabric portion having a transmission side and a receiving side,
- wherein the transmission side of the first fabric portion includes:
  - a transmission side input for receiving a first electronic signal carrying destination information about a destination switch module for the first electronic signal, the first electronic signal received from either:
    - a receiving side output of the second fabric portion or
    - an input device, via the client portion;
  - a modulator for converting said first electronic signal into a first plurality of optical signals containing the same information;
  - a transmission side multiplexer for converting the first plurality of optical signals into a multiplexed fabric signal,
  - a transmission side active switch having an input for receiving the multiplexed fabric signal, and at least ($R_i$−1) outputs, each output associated with one of the other switch modules in the same sub-array, the transmission side active switch configured to direct the multiplexed fabric signal from its input to any one of its outputs, based on the destination information;
- wherein the receiving side of the first fabric portion includes:
  - a receiving side active switch, having at least ($R_i$−1) inputs, each associated with one of the other switch modules in the same sub-array, and an output, the at least ($R_i$−1) inputs each configured to receive a multiplexed fabric signal from an output of a transmission side active switch of one of the other switch modules in the same sub-array, and configured to direct the multiplexed fabric signal from the input at which it is received to the output;
  - a receiving side demultiplexer for receiving the multiplexed fabric signal from the receiving side active switch, and configured to convert it into a second plurality of optical signals;
  - a photodetector for converting a second plurality of optical signals into a corresponding second electronic signal; and
  - a receiving side output for sending the second electronic signal to either:
    - a transmission side input of the second fabric portion, or
    - an output device, via the client portion.

3. An optoelectronic switch for transferring an optical signal from an input device to an output device, the optoelectronic switch including an array of interconnected switch modules, which are interconnected by an interconnecting fabric, wherein:
  the switch modules are arranged in an N-dimensional array, the i$^{th}$ dimension having a size $R_i$ (i=1, 2, ..., N), each switch module having an associated set of coordinates giving its location with respect to each of the N dimensions;

each switch module is a member of N sub-arrays $S_i$, each sub-array $S_i$ comprising:
$R_i$ switch modules whose coordinates differ only in respect of their location in the $i^{th}$ dimension, each of the N sub-arrays being associated with a different dimension, and
a set of passive routers, each having inputs and outputs, the path of an optical signal through any one of the passive routers from a given input being dependent on the wavelength of that optical signal;
each switch module has:
a client portion for connecting to an input device or an output device; and
a first fabric portion and a second fabric portion, each for processing signals and communicating with other switch modules, the first fabric portion having a transmission side and a receiving side,
wherein the transmission side of the first fabric portion includes:
a transmission side input for receiving a first electronic signal carrying destination information about a destination switch module for the first electronic signal, the first electronic signal received from either:
a receiving side output of the second fabric portion or
an input device, via the client portion; and
a modulator for converting said first electronic signal into a first plurality of optical signals containing the same information;
wherein each passive router in the set of passive routers associated with a given sub-array is configured to receive one of the first plurality of optical signals from a modulator on each switch module in that sub-array, and to direct that optical signal to one of its outputs, depending on the wavelength of that optical signal, and the input of the passive router at which it arrives, and
wherein the receiving side of the first fabric portion includes:
a photodetector configured to receive a second plurality of optical signals from the set of passive routers, and to convert the second plurality of optical signals into a corresponding second electronic signal; and
a receiving side output for sending the second electronic signal to either:
a transmission side input of the second fabric portion, or
an output device, via the client portion.

4. An optoelectronic switch for transferring an optical signal from an input device to an output device, the optoelectronic switch including an array of interconnected switch modules, which are interconnected by an interconnecting fabric, wherein:
the switch modules are arranged in an N-dimensional array, the $i^{th}$ dimension having a size $R_i$ (i=1, 2, ..., N), each switch module having an associated set of coordinates giving its location with respect to each of the N dimensions;
each switch module is a member of N sub-arrays $S_i$, each sub-array $S_i$ comprising:
$R_i$ switch modules whose coordinates differ only in respect of their location in the $i^{th}$ dimension, each of the N sub-arrays being associated with a different dimension, and
a fabric active switch, having $R_i$ inputs and $R_i$ outputs, configured to direct a signal from any one of the $R_i$ inputs to any one of the $R_i$ outputs depending on destination information contained in the signal;
each switch module has:
a client portion for connecting to an input device or an output device;
a first fabric portion for processing signals and communicating with other switch modules, the first fabric portion having a transmission side and a receiving side,
wherein the transmission side of the first fabric portion includes:
a transmission side input for receiving a first electronic signal carrying destination information about a destination switch module for the first electronic signal, the first electronic signal received from either:
a receiving side output of the first fabric portion or an input device, via the client portion;
a modulator for converting said first electronic signal into a first plurality of optical signals containing the same information;
a transmission side multiplexer for converting the first plurality of optical signals into a multiplexed fabric signal;
a transmission side active switch having an input and N outputs, for receiving the multiplexed fabric signal and directing it to one of the N outputs, the selection of said output based on the destination information, and wherein each of the N outputs is connected to a respective input of the fabric active switch included in each of the N sub-arrays of which that switch module is a member;
wherein, each fabric active switch is configured to direct a multiplexed fabric signal which arrives at one of its $R_i$ inputs, from a transmission active switch of a switch module to which it is connected, to one of its $R_i$ outputs, based on destination information contained in the multiplexed fabric signal, and:
wherein the receiving side of the first fabric portion includes:
a receiving side active switch having N inputs and an output, each of the N inputs configured to receive a multiplexed fabric signal from a respective output of the fabric active switch included in each of the N sub-arrays of which the switch module is a member, and is configured to direct the received multiplexed fabric signal from the input at which it is received to one of its outputs;
a receiving side demultiplexer for converting the multiplexed fabric signal into a second plurality of optical signals;
a photodetector configured to receive the second plurality of optical signals from the receiving side demultiplexer, and to convert the second plurality of optical signals into a corresponding second electronic signal; and
a receiving side output for sending the second electronic signal to either:
a transmission side input of the first fabric portion, or
an output device, via the client portion.

5. An optoelectronic switch according to claim 1, wherein the transmission side of the first fabric portion includes a transmission side packet processor, configured to receive the first electronic signal in the form of a packet, the packet having a packet header containing the destination information.

6. An optoelectronic switch according to claim 5, wherein the transmission side packet processor is configured to perform packet fragmentation wherein:
packets of data having the same destination module are arranged into frames having a predetermined size;
packets of data may be split over one or more frames into packet fragments; and
a frame may contain data from one or more packets.

7. An optoelectronic switch according to claim 6, wherein the receiving side of the first fabric portion includes a receiving side packet processor, configured to recreate the original packet of data from the packet fragments, when said packet is spread over more than one frame.

8. An optoelectronic switch according to claim 5, wherein:
the transmission side of the first fabric portion includes a plurality of modulators;
the transmission side packet processor is configured to perform packet slicing, wherein a frame or packet is sliced into a first plurality of electronic signals; and
after slicing, the transmission side packet processor is configured to send each of the first plurality of electronic signals to a different modulator in the plurality of modulators, whereby they are converted into the first plurality of optical signals.

9. An optoelectronic switch according to claim 8, wherein the receiving side of the first fabric portion includes a plurality of photodetectors, configured to convert the second plurality of optical signals into a second plurality of electronic signals, and further includes a receiving side packet processor configured to recombine the second plurality of electronic signals into the second electronic signal.

10. An optoelectronic switch according to claim 6, wherein the transmission side packet processor sends frames and/or packet fragments in a series of successive bursts, each burst containing only packets and/or packet fragments having the same destination module, and wherein pairs of sequential bursts are separate by a time interval.

11. An optoelectronic switch according to claim 2, wherein the active switches are optical active switches or electronic active switches.

12. An optoelectronic switch according to claim 2, wherein the transmission side of the first fabric portion includes a transmission side packet processor, configured to receive the first electronic signal in the form of a packet, the packet having a packet header containing the destination information.

13. An optoelectronic switch according to claim 12, wherein the transmission side packet processor is configured to perform packet fragmentation wherein:
packets of data having the same destination module are arranged into frames having a predetermined size;
packets of data may be split over one or more frames into packet fragments; and
a frame may contain data from one or more packets.

14. An optoelectronic switch according to claim 13, wherein the receiving side of the first fabric portion includes a receiving side packet processor, configured to recreate the original packet of data from the packet fragments, when said packet is spread over more than one frame.

15. An optoelectronic switch according to claim 13, wherein the transmission side packet processor sends frames and/or packet fragments in a series of successive bursts, each burst containing only packets and/or packet fragments having the same destination module, and wherein pairs of sequential bursts are separate by a time interval.

16. An optoelectronic switch according to claim 12, wherein:
the transmission side of the first fabric portion includes a plurality of modulators;
the transmission side packet processor is configured to perform packet slicing, wherein a frame or packet is sliced into a first plurality of electronic signals; and
after slicing, the transmission side packet processor is configured to send each of the first plurality of electronic signals to a different modulator in the plurality of modulators, whereby they are converted into the first plurality of optical signals.

17. An optoelectronic switch according to claim 16, wherein the receiving side of the first fabric portion includes a plurality of photodetectors, configured to convert the second plurality of optical signals into a second plurality of electronic signals, and further includes a receiving side packet processor configured to recombine the second plurality of electronic signals into the second electronic signal.

18. An optoelectronic switch according to claim 3, wherein the transmission side of the first fabric portion includes a transmission side packet processor, configured to receive the first electronic signal in the form of a packet, the packet having a packet header containing the destination information.

19. An optoelectronic switch according to claim 18, wherein the transmission side packet processor is configured to perform packet fragmentation wherein:
packets of data having the same destination module are arranged into frames having a predetermined size;
packets of data may be split over one or more frames into packet fragments; and
a frame may contain data from one or more packets.

20. An optoelectronic switch according to claim 19, wherein the receiving side of the first fabric portion includes a receiving side packet processor, configured to recreate the original packet of data from the packet fragments, when said packet is spread over more than one frame.

21. An optoelectronic switch according to claim 19, wherein the transmission side packet processor sends frames and/or packet fragments in a series of successive bursts, each burst containing only packets and/or packet fragments having the same destination module, and wherein pairs of sequential bursts are separate by a time interval.

22. An optoelectronic switch according to claim 18, wherein:
the transmission side of the first fabric portion includes a plurality of modulators;
the transmission side packet processor is configured to perform packet slicing, wherein a frame or packet is sliced into a first plurality of electronic signals; and
after slicing, the transmission side packet processor is configured to send each of the first plurality of electronic signals to a different modulator in the plurality of modulators, whereby they are converted into the first plurality of optical signals.

23. An optoelectronic switch according to claim 22, wherein the receiving side of the first fabric portion includes a plurality of photodetectors, configured to convert the second plurality of optical signals into a second plurality of electronic signals, and further includes a receiving side packet processor configured to recombine the second plurality of electronic signals into the second electronic signal.

24. An optoelectronic switch according to claim 4, wherein the active switches are optical active switches or electronic active switches.

25. An optoelectronic switch according to claim 4, wherein the transmission side of the first fabric portion includes a transmission side packet processor, configured to receive the first electronic signal in the form of a packet, the packet having a packet header containing the destination information.

26. An optoelectronic switch according to claim 25, wherein the transmission side packet processor is configured to perform packet fragmentation wherein:
packets of data having the same destination module are arranged into frames having a predetermined size;
packets of data may be split over one or more frames into packet fragments; and
a frame may contain data from one or more packets.

27. An optoelectronic switch according to claim 26, wherein the receiving side of the first fabric portion includes a receiving side packet processor, configured to recreate the original packet of data from the packet fragments, when said packet is spread over more than one frame.

28. An optoelectronic switch according to claim 26, wherein the transmission side packet processor sends frames and/or packet fragments in a series of successive bursts, each burst containing only packets and/or packet fragments having the same destination module, and wherein pairs of sequential bursts are separate by a time interval.

29. An optoelectronic switch according to claim 25, wherein:
the transmission side of the first fabric portion includes a plurality of modulators;
the transmission side packet processor is configured to perform packet slicing, wherein a frame or packet is sliced into a first plurality of electronic signals; and
after slicing, the transmission side packet processor is configured to send each of the first plurality of electronic signals to a different modulator in the plurality of modulators, whereby they are converted into the first plurality of optical signals.

30. An optoelectronic switch according to claim 29, wherein the receiving side of the first fabric portion includes a plurality of photodetectors, configured to convert the second plurality of optical signals into a second plurality of electronic signals, and further includes a receiving side packet processor configured to recombine the second plurality of electronic signals into the second electronic signal.

* * * * *